United States Patent [19]
Fisher et al.

[11] Patent Number: 5,132,988
[45] Date of Patent: Jul. 21, 1992

[54] ADAPTIVE DECISION FEEDBACK EQUALIZER APPARATUS FOR PROCESSING INFORMATION STORED ON DIGITAL STORAGE MEDIA

[75] Inventors: Kevin D. Fisher; William L. Abbott, both of Menlo Park; John M. Cioffi, Cupertino, all of Calif.; Philip S. Bednarz, Birmingham, Mich.

[73] Assignee: Board of Trustees, Leland Stanford Jr. University, Stanford, Calif.

[21] Appl. No.: 622,106

[22] Filed: Dec. 3, 1990

[51] Int. Cl.⁵ .................... H03M 7/30; H03M 7/40
[52] U.S. Cl. ........................... 375/14; 333/18; 364/724.2
[58] Field of Search .......... 375/11, 12, 14; 333/18; 364/724, 724.2; 360/31, 46, 65, 67, 68

[56] References Cited

U.S. PATENT DOCUMENTS

| | | | |
|---|---|---|---|
| 4,422,109 | 12/1983 | Sampei et al. | 360/65 |
| 4,908,722 | 3/1990 | Sonobe | 360/46 |
| 4,953,041 | 8/1990 | Huber | 360/65 |
| 4,953,183 | 8/1990 | Bergmans et al. | 375/14 |
| 5,008,903 | 4/1991 | Betts et al. | 375/14 |

Primary Examiner—Stephen Chin
Attorney, Agent, or Firm—Rosenblum, Parish & Bacigalupi

[57] ABSTRACT

Adaptive decision feedback equalizer apparatus for processing information stored on disk or tape media or the like including a data input buffer (34), a gain acquisition circuit (42), a timing acquisition circuit (40) operative to generate timing error signals for controlling the sampling phase of the read signals input to the input buffer, a synchronizing circuit (44) for generating sync detect signals and polarity signals, an FIR filter (36) for generating linear filter output signals, register means (39), feedforward update logic (38) for adjusting the equalizer coefficient signals to develop undated coefficient signals, a dual ported RAM (50) for storing a plurality of the equalizer coefficient signals, feedback logic (48) responsive to the linear filter output signals, equalizer coefficient signals obtained from the RAM, and train data signals, and operative to compute the equalizer error signals and equalizer output signals, feedback update logic (52) for adjusting the values of the coefficient signals for input back to the RAM as update signals, steady-state timing logic (54), and a controller (46) responsive to the polarity signals and the sync detect signals and operative to generate the train data signals and mode control signals for causing the equalizer apparatus to operate in either a set-up/test mode or a run mode, whereby read signals input from a storage media are sampled, amplified and digitally processed to decode stored information bits with the result that, as compared to prior art systems, storage density may be increased and error rate decreased.

21 Claims, 21 Drawing Sheets

COMPARISON OF DATA STORAGE AND TRANSMISSION CHANNELS.

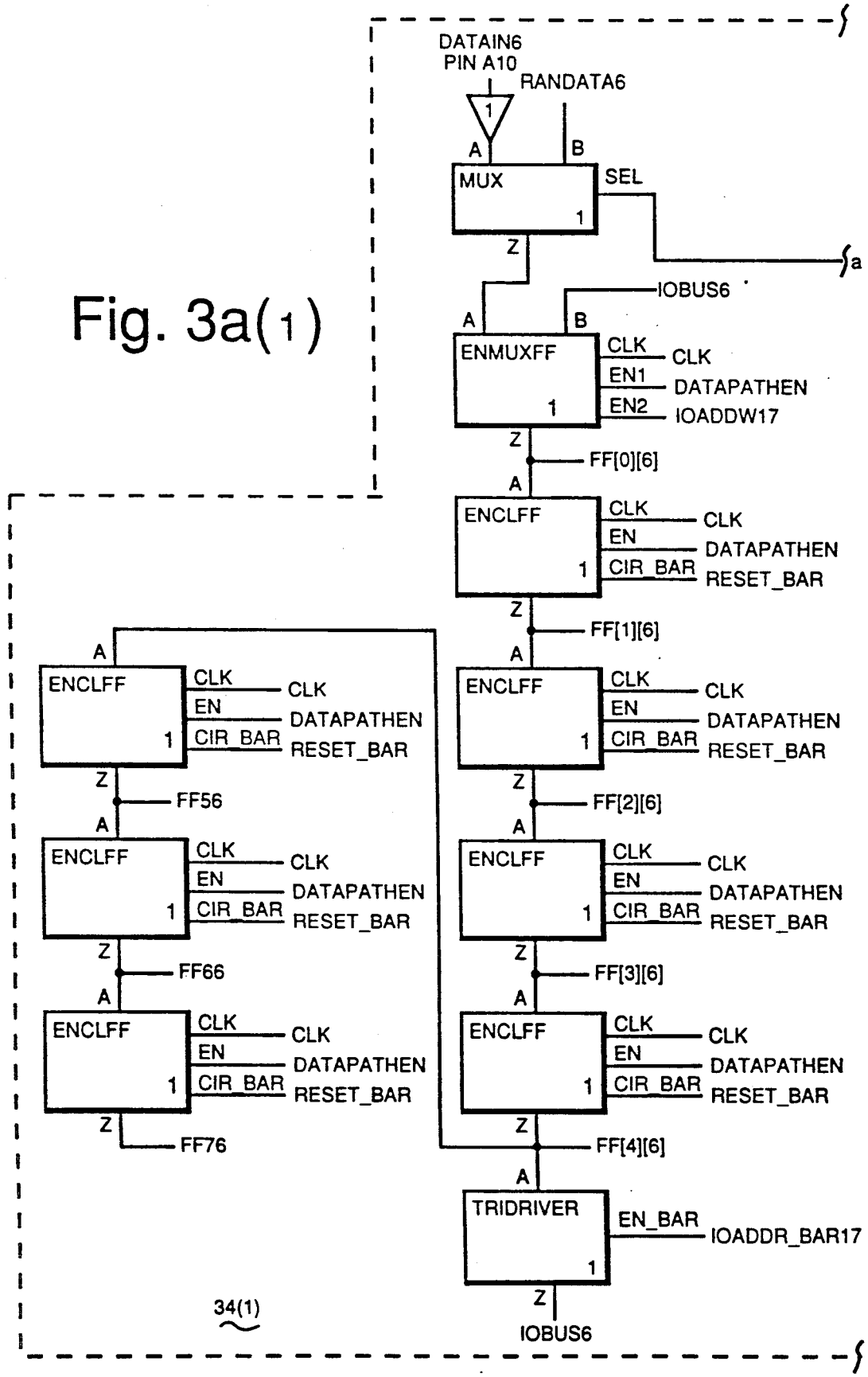
Fig. 3a(1)

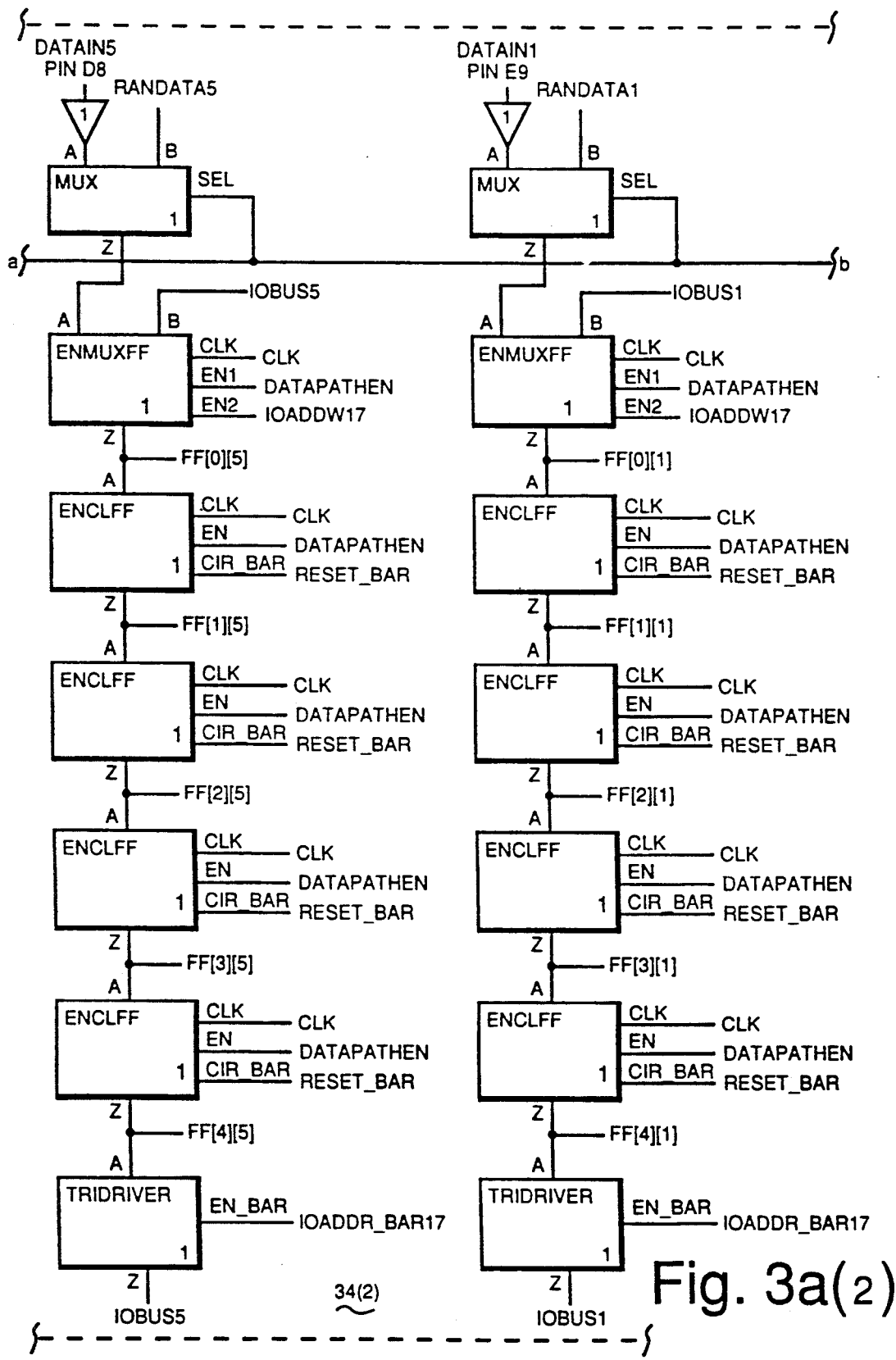
Fig. 3a(2)

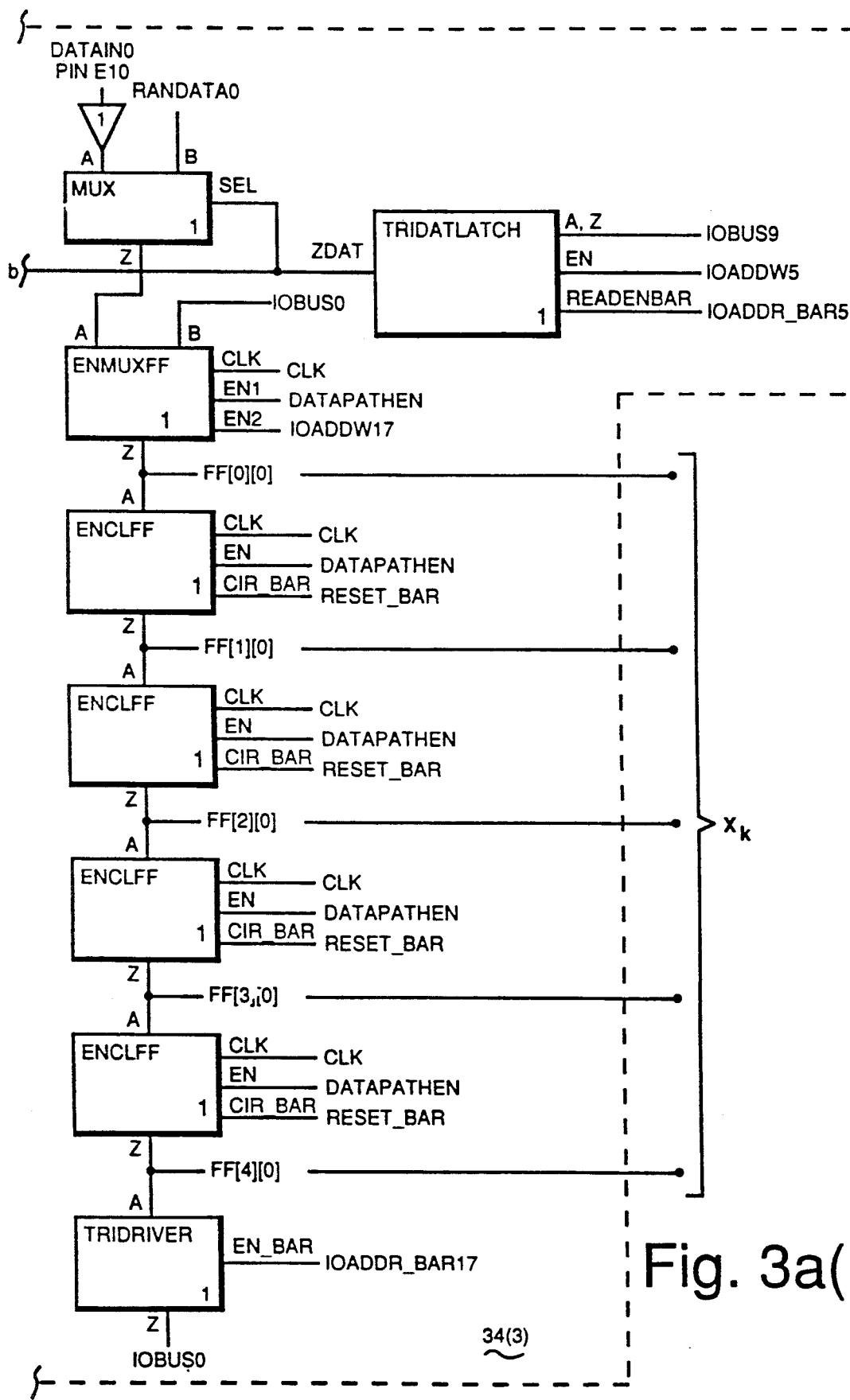
Fig. 3a(3)

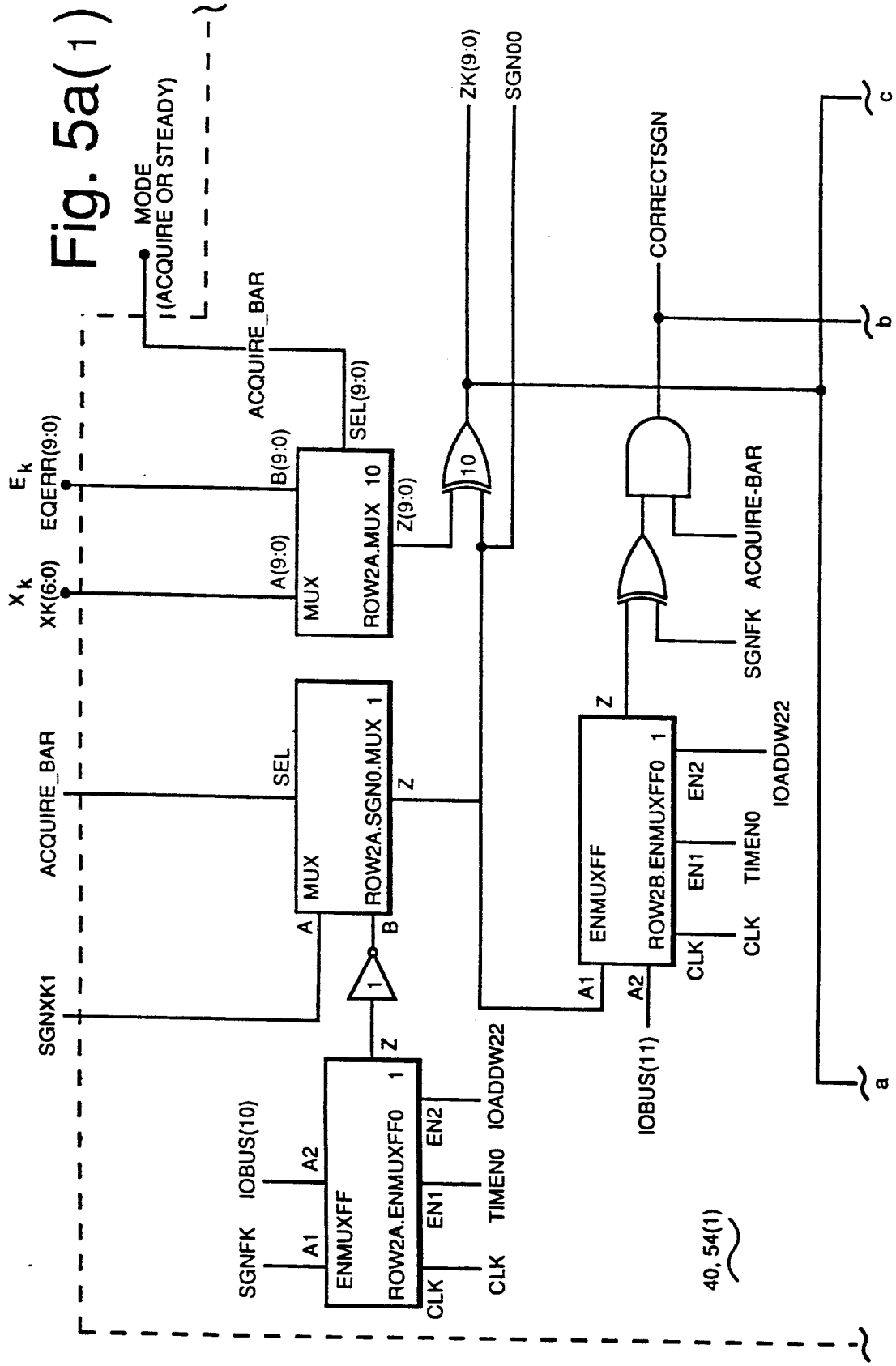
Fig. 5a(1)

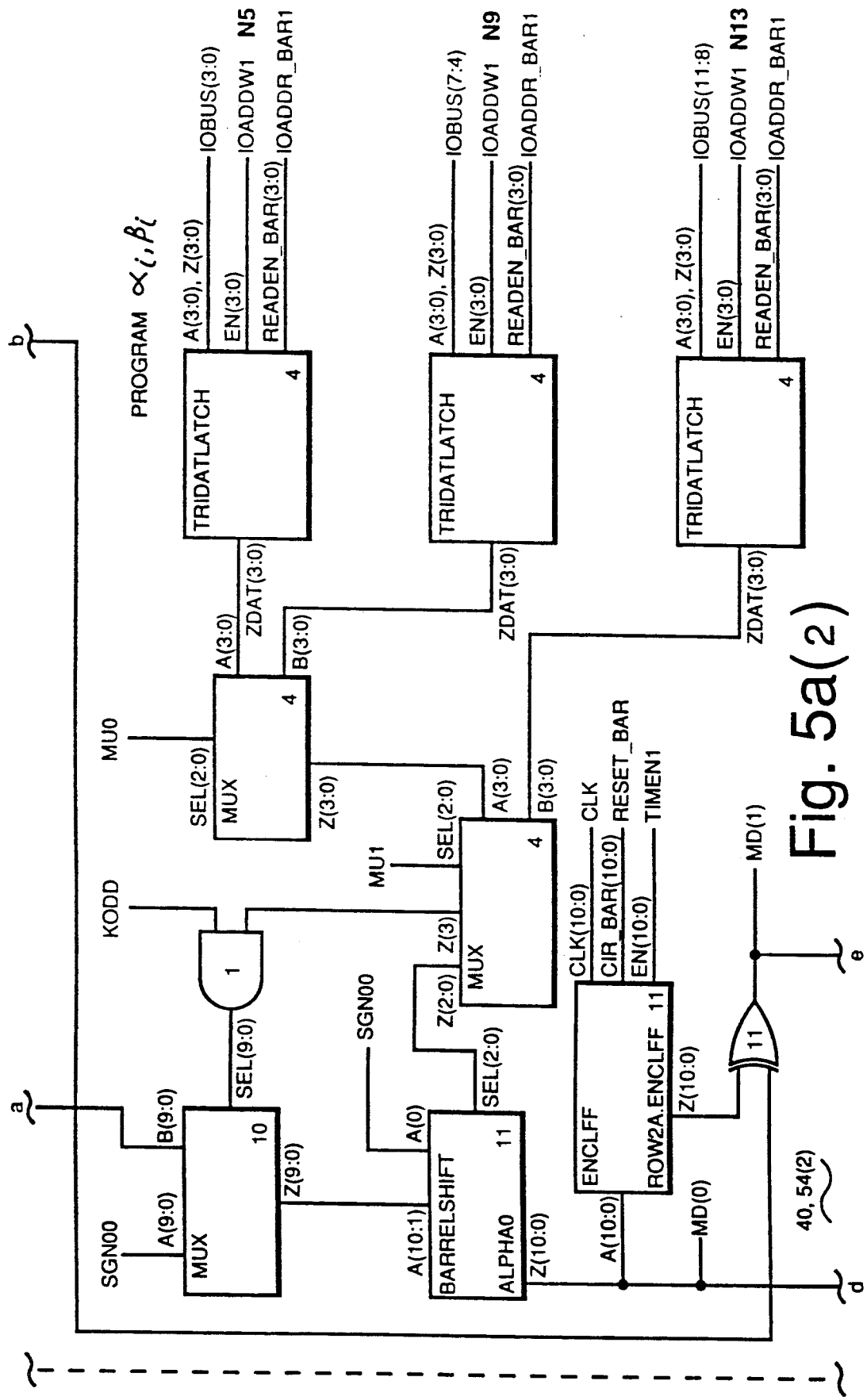
Fig. 5a(2)

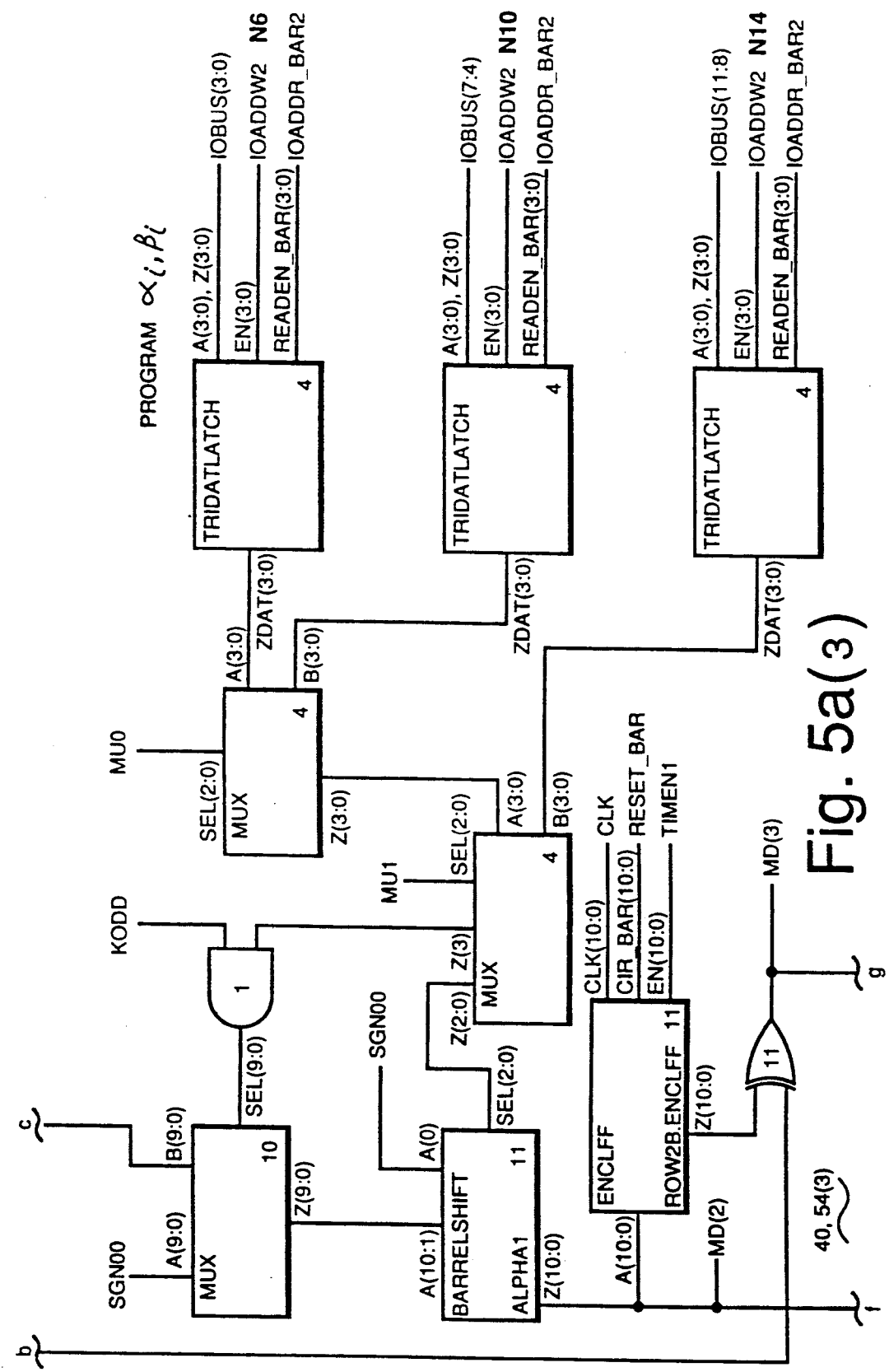
Fig. 5a(3)

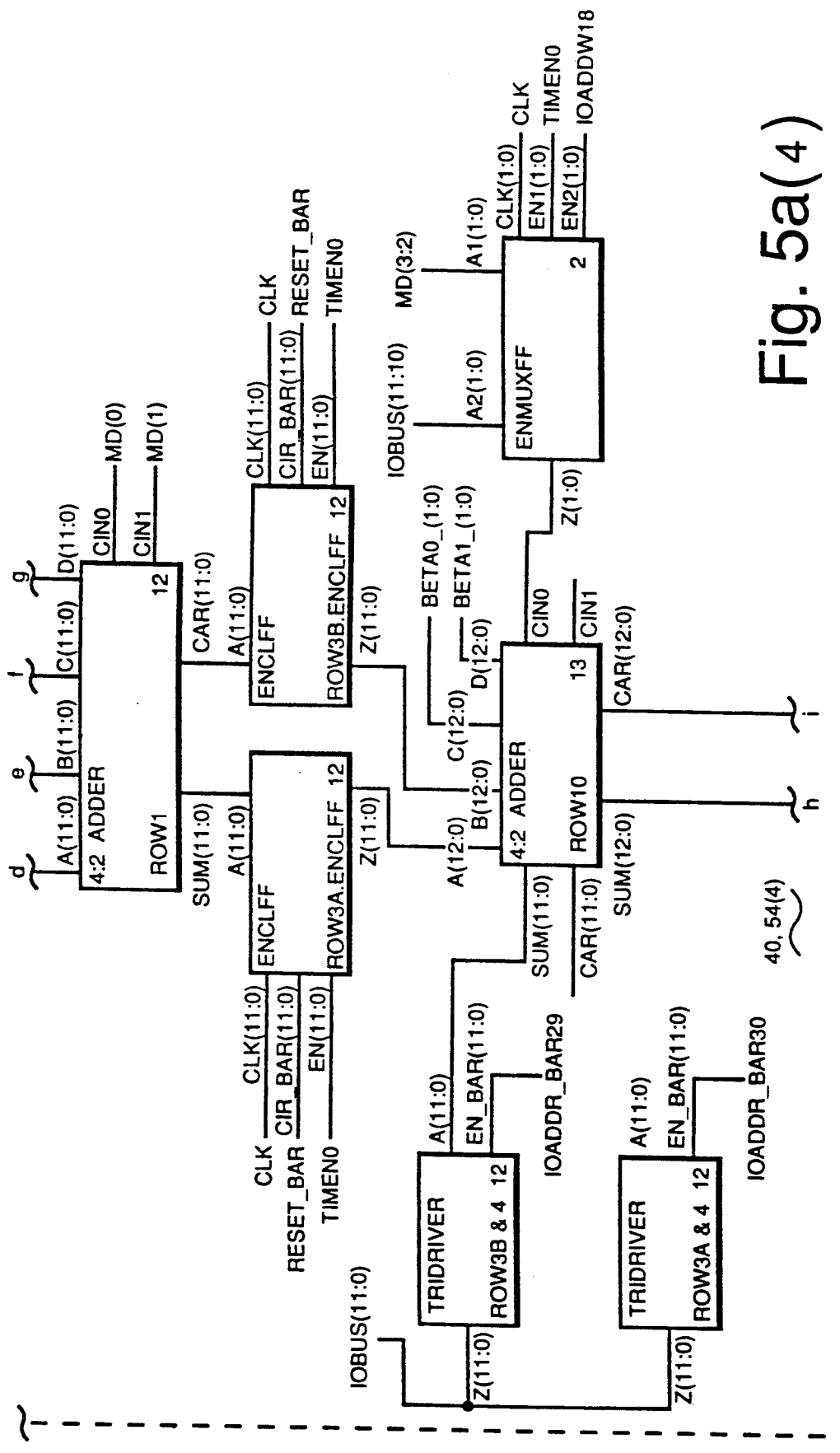
Fig. 5a(4)

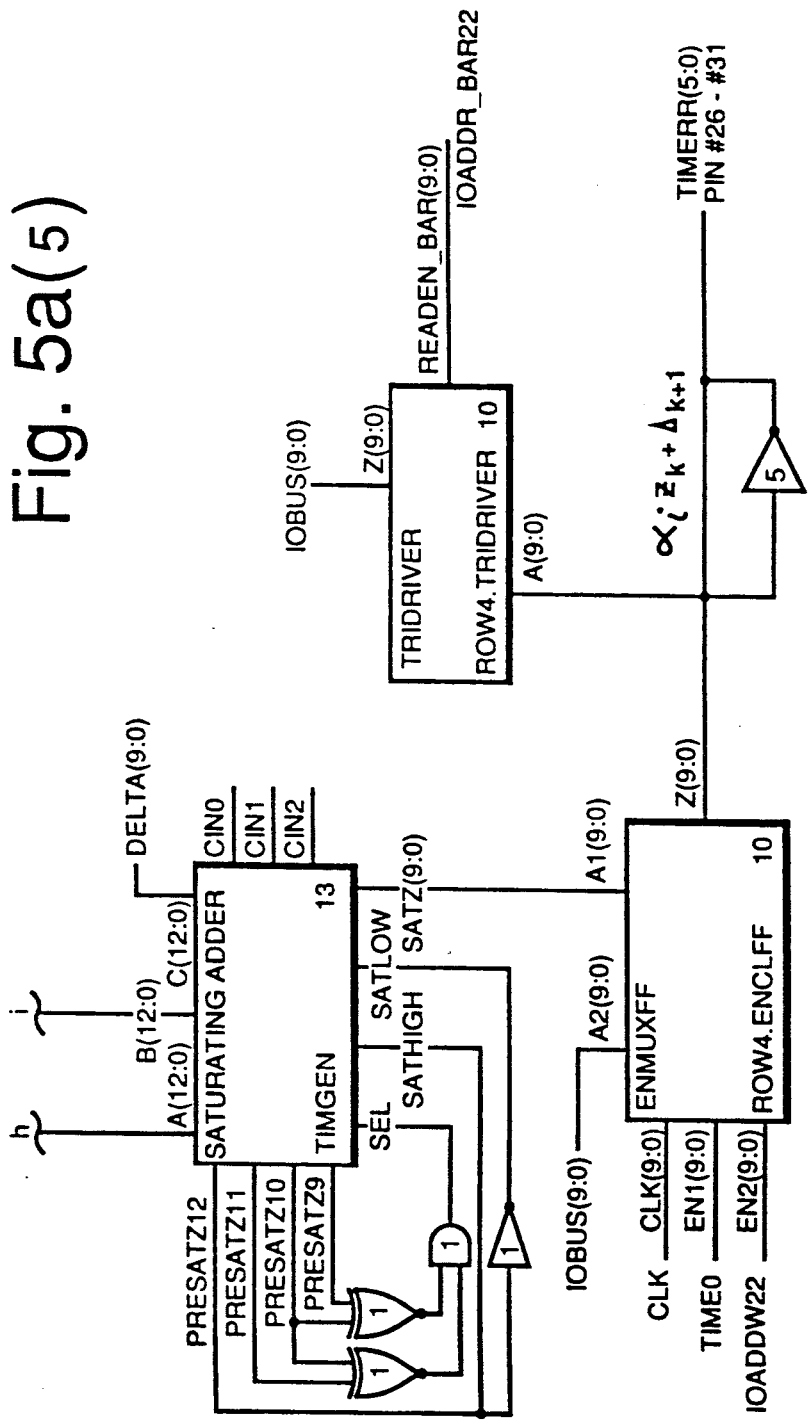
Fig. 5a(5)

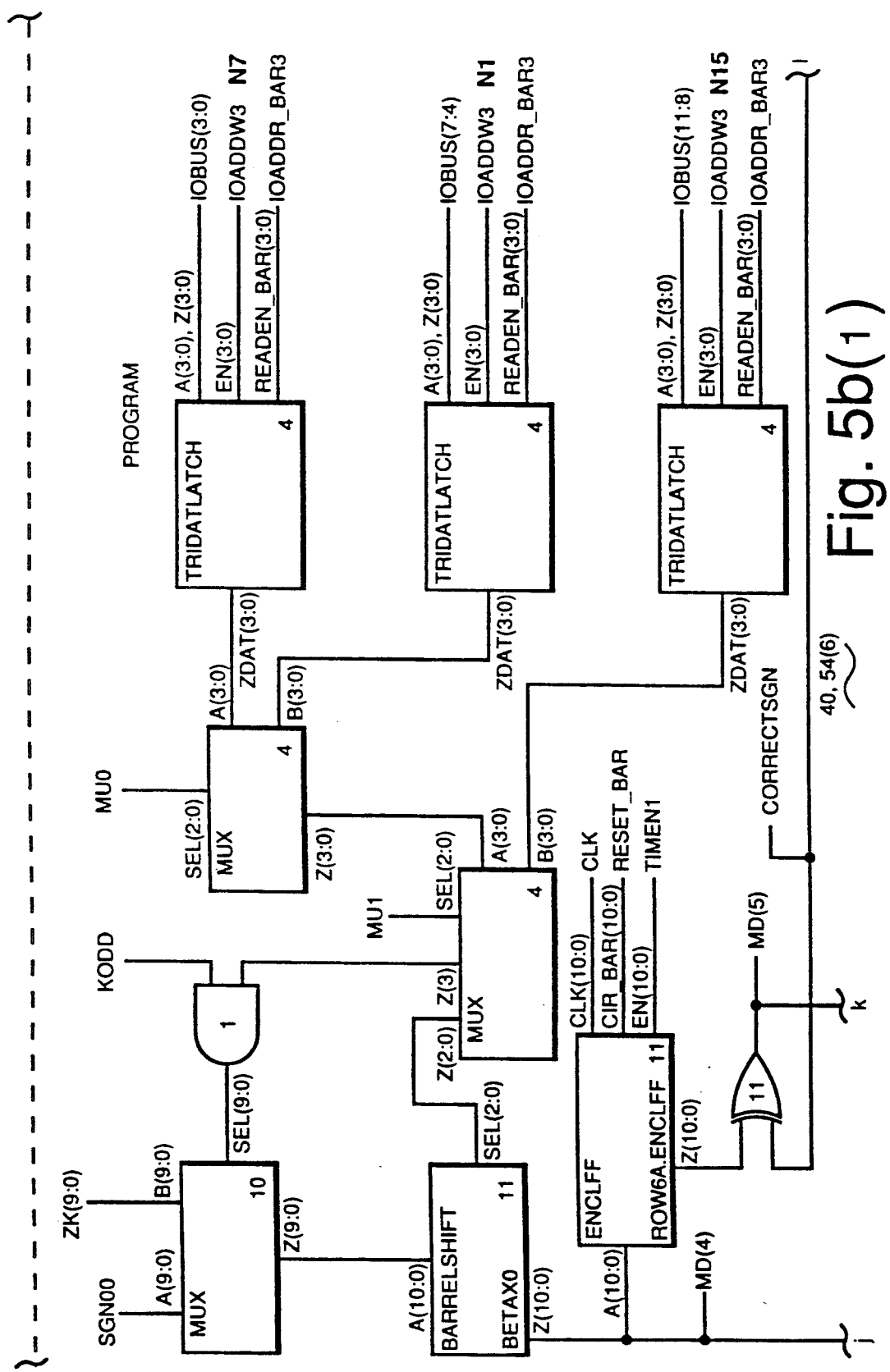
Fig. 5b(1)

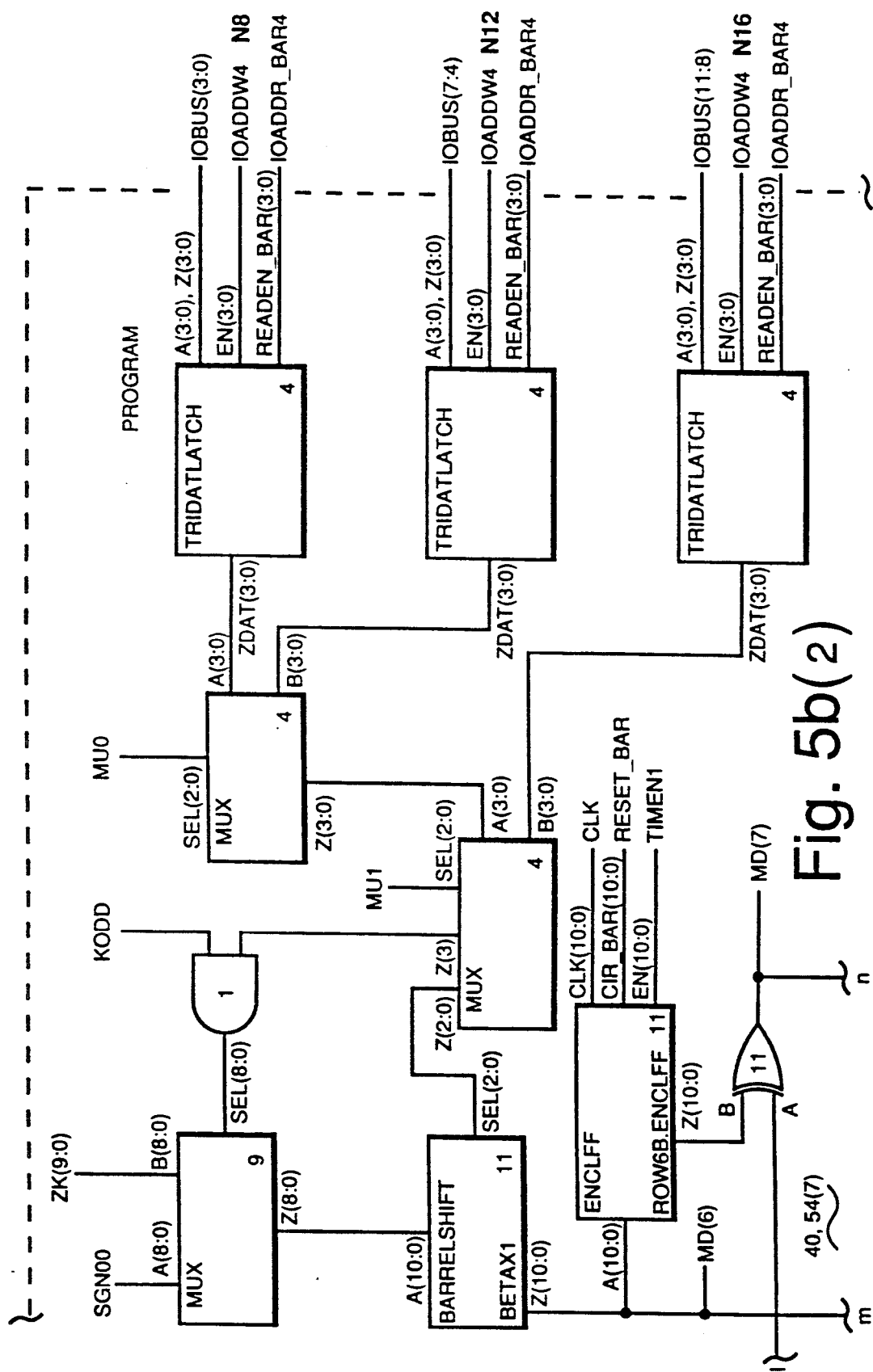
Fig. 5b(2)

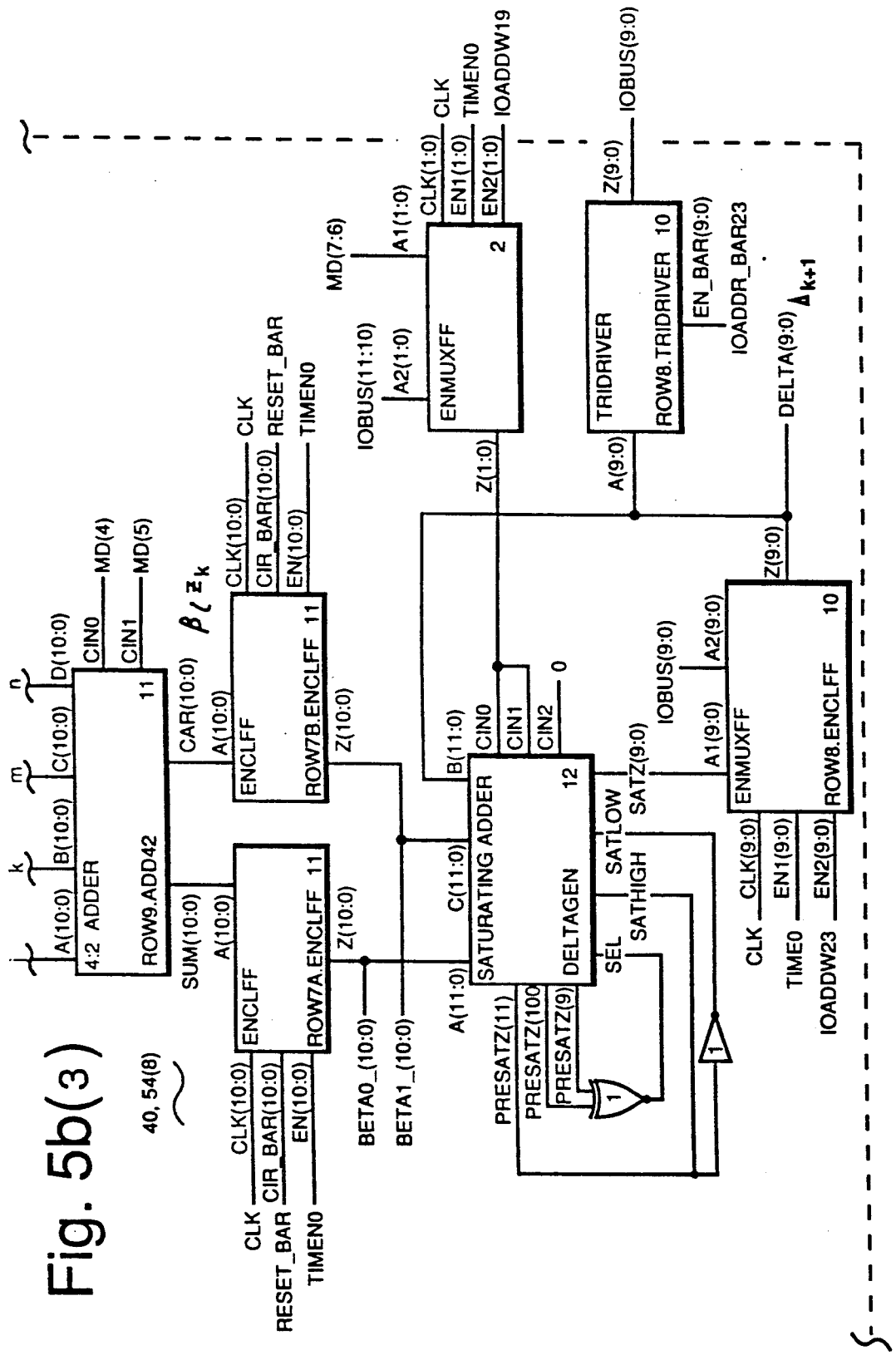
Fig. 5b(3)

ADAPTIVE DECISION FEEDBACK EQUALIZER APPARATUS FOR PROCESSING INFORMATION STORED ON DIGITAL STORAGE MEDIA

BACKGROUND OF THE INVENTION

1. Field of the Invention

The present invention relates generally to digital detection apparatus and more particularly to an improved adaptive decision feedback equalizer device for increasing data storage density and decreasing data error rates through processing of the read head output signal.

2. Brief Description of the Prior Art

The advent of the information age brings an enormous demand for the storage of digital data, along with the demands for processing and transmission of such data. The density of information stored in a single system has had to increase to accommodate this growing demand. For each of the past three decades, the capacity of magnetic disk storage units has grown by a factor of 10. This explosive growth has been fueled by several factors: improvements in the design of heads and disks, decreases in the disk-media particle size, decreases in the head gap length and flying height, and improvements in servo accuracy for increased track density. Mark H. Kroyder, "Introduction to the Special Issue on Magnetic Information Storage Technology", *Proceedings of the IEEE*, November 1986, pp. 1475-1476. More efficient modulation (or "run-length") coding schemes have also been used to increase linear density. K. A. Schouhamer Immink, "Run-Length Limited Sequences", *Proceedings of the IEEE*, November 1990, pp. 1745-1759.

The growing worldwide demand for digital-storage capacity has also prompted interest in the use of digital signal processing methods as a means of continuing the increases in density. The general similarity of the disk read and write processes to data-detection and transmission in communication has focused a portion of this interest on the application of equalization and coding methods to disk-storage channels. These methods can more efficiently use the available spatial "bandwidth" of disk channels, leading to the desired density increases. In particular, adaptive equalization is attractive since it permits a significant reduction in manufacturing costs by allowing a greater component yield through to relaxed tolerances. In addition to providing for increased density, adaptive equalization also permits a reduction in servicing costs because of a reduced need for "fine-tuning" on the customer's premises. Despite the general similarity to a data transmission channel, the data storage channel is significantly different.

In any storage system, there is a channel that consists of the write-head and associated pre-processing circuitry, the storage media itself (usually a magnetic disk or tape, an optical disk or a magneto-optical media), and the read-head and associated data-detection circuitry. These three components are similar to the transmit, channel, and receive functions in digital communication. Thus, communication specialists have been allured, in increasing numbers, by this unusual data channel The similarities and differences between the data storage channel and the data transmission channel are illustrated in FIG. 1. In either channel, data is encoded prior to the input and then detected and decoded at the output. Also the goal in both channels is to reliably pass as much information as possible. The storage channel will have high data density, while the transmission channel will have high data rate. A major difference exists between the modulator in the transmission channel and write-processing and write-channel sections in the storage channel. Because of hysteresis effects in the media, only two levels($\pm 1$ effectively) can be input to the write channel. Information is stored in the media by the presence or absence of a transition from one data state to another, corresponding to transitions from $+1$ to $-1$ (or vice-versa) in the storage channel input. To increase linear density in the storage channel, spacing between transitions must be decreased. In contrast, the transmission channel may use multilevel configurations and carrier modulation to increase the transmitted data rate, because hysteresis is not present in the transmission channel. At high storage densities, severe Intersymbol Interference (ISI) is therefore inevitable; whereas in most transmission channels, ISI is maintained at comparatively moderate levels so that relatively simple equalization is sufficient.

FIG. 1 also indicates that the storage read channel (read-head) processes the following inputs:

1) The data in the storage media,
2) Media noise (including overwrite and data-dependent noises), and
3) Adjacent track interference (correlated, non-Gaussian) on the media.

A final electronics (white-Gaussian) noise is added at the read-channel output. The data transmission channel usually has only an additive noise (white-Gaussian) component, but in some cases, such as subscriber loops, it also suffers from crosstalk and/or adjacent channel (when frequency multiplexed) interference. The adjacent track interference of the storage channel is similar to crosstalk and is of crucial importance in almost all storage systems. In addition to the hysteresis, magnetic media and some read channels exhibit nonlinear effects that become more pronounced as the transition-spacing decreases (density increases). In the transmission channel, these effects are largely absent. The storage channel exhibits random gain fluctuations and actually spectral variations as the position of the head varies with respect to the media. These fluctuations become more pronounced as the "flying height" of the head is reduced, and are a major limiting factor in contact (head "touches" media) recording systems, such as magnetic tapes or floppy disks. These fluctuations are analogous to the flat fades (amplitude drops) that occur in digital radio. Finally, the media thickness varies around the disk. This phenomenon is usually called "once-around modulation", as it is periodic due to continuous variation of media thickness around one track. "Once-around modulation" is similar to a small frequency offset in carrier-modulated data transmission.

For any particular system, both storage and transmission channels are often selected (or switched) from a multitude of similar media. The variation of potentially selected media in efficiently used data transmission channels alone often mandates adaptive detection methods. One would hope that this would not be the case in storage systems, since once a specific head and media are associated during the manufacturing process, then a fixed detection method could be applied. However, this is not the case with interchangeable storage media such as floppy disks or tapes. In addition, for servicing reasons, it is highly undesirable to have a specific storage device "tuned" to a particular head and media, as replacement of either would force this tuning process to be repeated. Furthermore, in fixed hard-disks, the channel changes significantly with changes (as small as 1 μ in some disks) in the position of the read-head with respect to the corresponding (earlier) position of the write-head for the same data on the media. This "off-track position" effect is amplified by the previously mentioned "flying height" and "thickness" variations. Thus, adaptive methods are highly desirable in storage-channel detection as well as in transmission-channel detection, even though the sources of channel variation are different. Gains introduced through the use of adaptive equalizers can also be translated into improved (wider) tolerance specifications on heads and media. Thus, manufacturing yield can effectively be improved. Even a small, for example 10%, yield improvement can lead to savings of millions of dollars in manufacturing costs for high-sales-volume storage products.

Adaptive methods are desirable in disk storage channels to mitigate an additional important type of channel variation. This variation occurs with changing radius on the spinning disk. The stored information bits can be construed as successive positions along a track with ones and zeros being distinguished by the presence or absence of transitions in the direction of the magnetic field in each of the positions. Tracks are circular rows of bits arranged concentrically on the disk. Typical high-end hard disks may have 10,000-30,000 b/in. along a track and 1,000-2,000 tracks/in. Thus, the "width" w of a bit is typically smaller than its radial length. The capacity of a disk can be improved by increasing the linear density of bits along the tracks or by increasing the track density through closer placement of adjacent tracks. For the usual case of a disk spinning at a constant angular velocity and constant read data rate 1/T, ISI effects will be most limiting at the Inner Diameter (ID) and least evident at the Outer Diameter (OD). This is because the "transitions" are physically closest together at the ID and farthest apart at the OD. The disk channel's range of radial variation may be large, as the OD/ID ratio may be 1.5 or higher in present storage products, and is likely to increase as smaller disks become more common. A good equalizer characteristic is thus strongly a function of diameter. Adaptive equalization can be used to mitigate the varying amounts of intersymbol interference from ID to OD and thereby improve overall detection (i.e., reduce error probability).

The above uses of adaptive equalization have become increasingly important to future capacity improvements in data storage and retrieval for several reasons. First, the aforementioned potential of significant density increases can satisfy some of the demand for increased storage capacity. Second, the achieved density improvements are not strongly a function of the specific head and media used in the storage channel. This independence renders adaptive equalization compatible with the channel components chosen in almost any storage system, although the adaptive equalizer details can vary significantly from one storage product to another. Even though magnetic disk channels, independent of digital signal processing and coding, can improve through the use of better components (thin film or metallic disks, magneto-optics, magneto-resistive heads, and/or vertical recording, etc.), the adaptive equalizer can provide further density gains. Third, as high-speed digital VLSI (Very Large Scale Integration) circuits become less expensive, digital technologies have the potential for reducing costs in reliably achieving high densities as compared to improving the mechanics of the storage channel. This potential appears imminent as improvement of analog channel components becomes more costly and less effective in terms of potential gains. Finally, the number of advanced component technologies on the horizon for magnetic tape and disk recording has dwindled in recent years, motivating more efficient use, via signal processing and coding, of existing spatial bandwidth on the media. It should be noted that adaptive equalization can potentially be used with optical disks and other magnetic-recording channels. Thus, the objective in using adaptive equalization in disk and tape channels is to increase linear density by continuously varying the receiver detection circuitry to alleviate ISI effects as a function of diameter variation, specific disk channel components, and varying channel mechanics. Of course, the specific use of adaptive equalization may vary considerably among the many different types of media systems sold, just as the specific use of adaptive equalization may vary widely in communication channels (for example, voiceband modems versus digital subscriber loops or digital microwave links).

Crucial to the successful use of adaptive equalization in disk channels is an accurate understanding and characterization of these channels. In a publication entitled "Adaptive Equalization for Magnetic Storage Channels" by J.M. Cioffi et al, *IEEE Communications Magazine*, pp. 14-29, February 1990, a description is given of the storage channel's important signal-processing characteristics. SNR as a measure for performance evaluation is also discussed. A discussion of the possibility of using decision feedback equalization to increase storage density is given in a paper by K. D. Fisher et al entitled "An Adaptive DFE for Storage Channels Suffering from Nonlinear ISI", Proceedings of 1989 IEEE International Conference on Communications, Boston MA, June 1989. Copies of these publications are attached hereto as Exhibits A and B and are expressly incorporated herein by reference.

BRIEF DESCRIPTION OF THE DRAWING

FIGS. 3a(1)-FIG. 3a(3) are detail descriptions of data input buffer register 34 as shown in FIG. 2.

FIGS. 5a(1)-%a(5) and 5b(1)-5b(3) collectively is a schematic illustration of an implementation of the timing acquisition unit ACQUIRE and steady-state timing recovery unit STEADY shown in FIG. 2 of the drawing;

DETAILED DESCRIPTION OF THE PREFERRED EMBODIMENT

Figure 1:
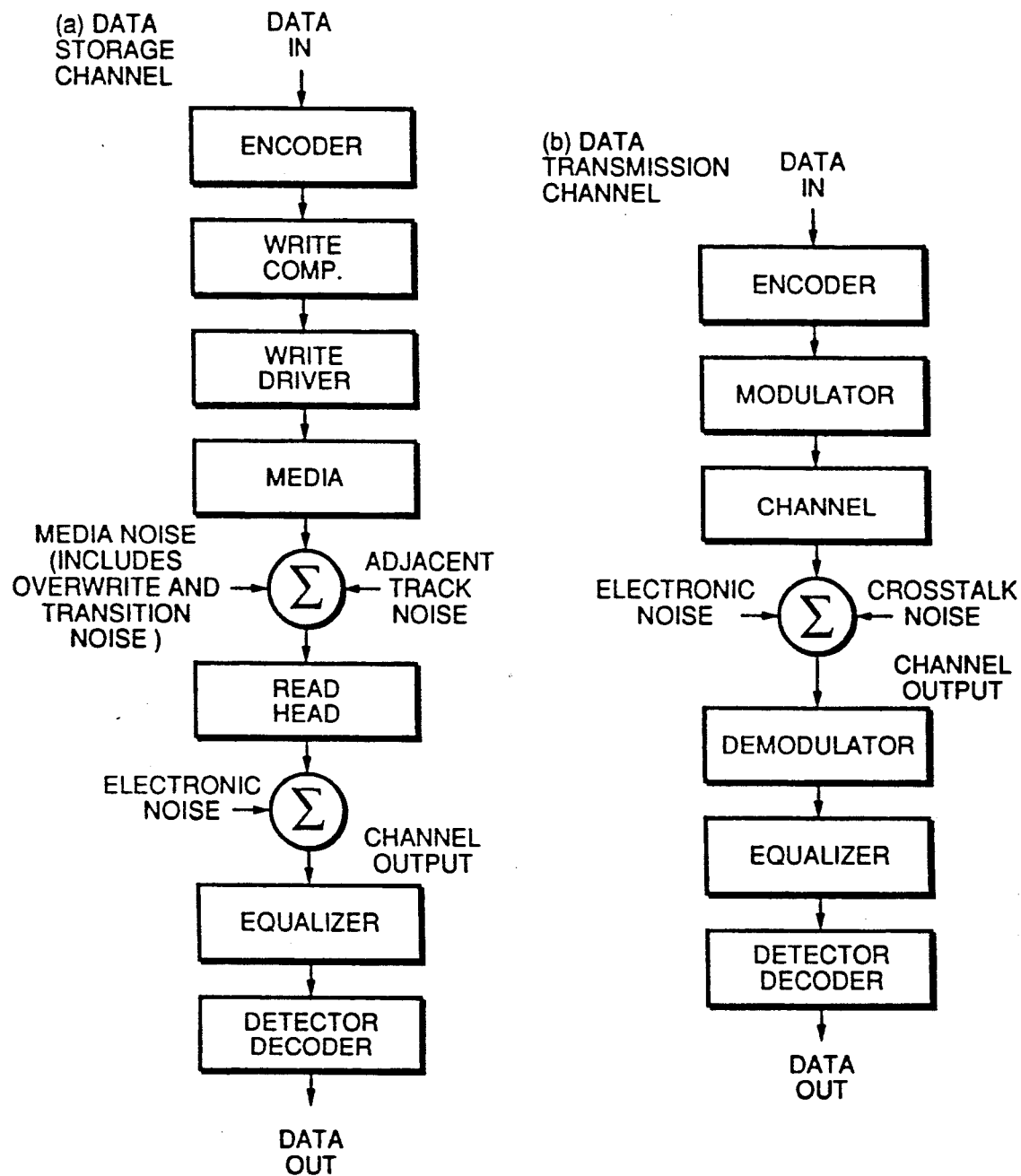
FIG. 1 is a schematic comparison of data storage and transmission signal processing channels.
Figure 2:
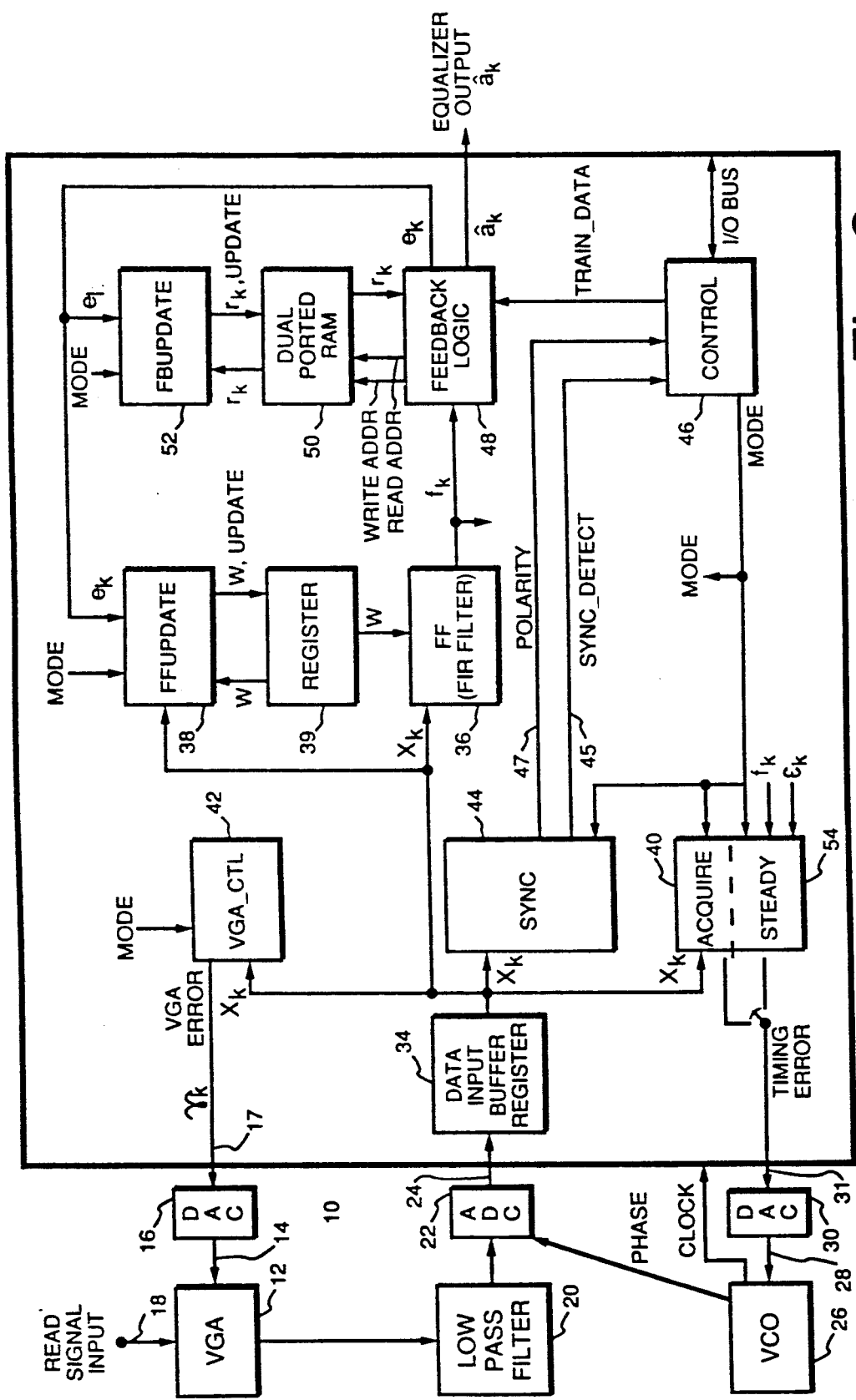
FIG. 2 is a block diagram illustrating a data storage read signal processor including an adaptive decision feedback equalizer apparatus in accordance with the present invention.

Referring now to FIG. 2 of the drawing, a presently preferred embodiment of the invention is shown at 10 together with a voltage gain amplifier (VGA) 12 which, in response to control signals input at 14 via a digital-to-analog converter 16, controls the voltage gain of a read signal obtained from a storage media and input at terminal 18. The gain adjusted signal is then passed through a low-pass filter 20 and then through an analog-to-digital converter 22 for input at 24 to the adaptive RAM-DFE 10. The phase of the input signal is adjusted in the ADC 22 in response to a phase control signal developed by a voltage control oscillator (VCO) 26 in response to a control input on line 28 developed by a digital-to-analog converter 30. The digital signals input to DAC 16 and DAC 30 are obtained from unit 10 on output lines 17 and 31 respectively.

Timing recovery is the method of determining the sampling instant for the digital equalizer. Gain control (VGA) determines the dynamic range of the analog-to-digital converter (ADC) data input. In a nutshell, the storage media output appearing at terminal 18 is an analog signal (analog n both time and magnitude). The timing-recovery function digitizes the signal in time (one sample per bit period), and the gain control function (plus ADC) digitizes the signal in magnitude. Timing recovery is important because frequency variations can exist in the write and read clocks, and some phases of the clock cycle will produce better performance (lower error rates from the storage media) than others. The timing recovery function tracks frequency variations in the channel write (and read) clock and determines the proper sampling phase. Gain control variability amplifies the storage media output to the full range of the ADC. This amplification reduces quantization noise and subsequently reduces error rates. Discussions of timing-recovery may be found in S. U. H. Qureshi, "Timing Recovery for Equalized Partial-Response Systems", *IEEE Transactions on Communications*, December 1976, pp. 1326–1321, and K. H. Mueller and M. S. Muller, "Timing Recovery in Digital Synchronous Systems", *IEEE Transactions on Communications,* May 1976, pages 516–531.

The RAM-DFE 10 is an all digital post read-head processor that is used to improve the performance of a digital recording channel. The performance improvement can be translated into density gains, lower error rates, or manufacturing tolerance (yield) improvements. The basic concept is to use adaptive equalization, a technique long used in digital data transmission applications, in the data storage recording channel. However, straightforward application of communication methods is not possible because of the differences between a data storage recording channel and a data transmission channel. As discussed above, these differences include more severe channel distortion in the form of severe intersymbol interference, nonlinear effects, and timing clock variation. Also, there is a greater variation in channel characteristics (with radius in disk-data storage channels) than is normally encountered in data transmission applications. Furthermore, the very high data rates dictated by the data storage channel require adaptive equalizer implementations with processing speeds in excess of those attempted in data transmission.

The present invention is based on a structure known in communications as an adaptive decision feedback equalizer (DFE) with several novel modifications that enable the structure to be applied to the recording channel. Among these novel modifications are a very high-speed feedforward filter (FF) that is designed using an unusual minimum-delay constraint and the full-speed (every bit period) adaptive updating (FFUPDATE) of that feedforward section. A look-up table or RAM is used to store the feedback filter coefficients, which form an estimate of any trailing intersymbol interference (the feedforward section tries to make the filtered channel response appear as if all intersymbol interference can be subtracted with the feedback section in a DFE). The use of the look-up table permits a very high-speed realization, allowing the output to be available earlier than would be the case in a standard filter implementation, and also permits nonlinear intersymbol interference (which can occur in storage channels) to be subtracted along with linear intersymbol interference. A novel updating algorithm (FBUPDATE) is also provided for the feedback filter (FB) that will converge to the correct optimum settings. In addition, methods are introduced for storage-channel recording that are fully digital and that allow the initial acquisition of timing phase and frequency (ACQUIRE), synchronization to the training block (SYNC), gain control (VGA_CTL), and initial training (FFUPDATE and FBUPDATE) of the RAM-DFE structure. Finally, a steady-state timing method (STEADY) is introduced that maintains synchronization in the presence of severe timing frequency variation (that is characteristic of disk recording) and that can be implemented at high-speed with a minimum of latency.

More particularly, the RAM-DFE 10 is in the preferred embodiment a VLSI implementation using BiCMOS technology and includes a data input buffer register 32 for receiving digital information input on line 24 and for outputting blocks of read signal data $x_k$ for input to a feedforward filter (FF) unit 36, a feedforward update (FFUPDATE) unit 38, a timing acquisition (ACQUIRE) unit 40, a voltage gain amplifier update (VGA-CTL) unit 42, and a synchronization field detection (SYNC) unit 44.

As will be illustrated in more detail in subsequent Figures, the fully programmable Feedforward Filter (FF) unit 36 forms a linear combination of the chip input data using equalizer coefficients w received from the FFUPDATE unit 38 via a register 39. The function of FF unit 36, which can equivalently be identified as a Finite Impulse Response filter, is described by $$f_k = \sum_{i=0}^{L-1} w_i x_{k-i} \quad (1)$$

where $w = [w_o \ldots w_{L-1}]^T$ corresponds to the coefficient vector and $x_k$ is the read-signal input vector at time k. The feedforward filter (which can be decomposed into adders) is generated by a computer program (software tool) that automatically synthesizes the adder input- /output connections for a Wallace Tree from a library of full adder components. A discussion of the Wallace Tree can be found in C. S. Wallace, "A Suggestion for Fast Multipliers", *IEEE Transactions on Electronic Computers*, February 1964, p. 59. The program automatically uses the technology dependent delay characteristics of the adder component to optimize the component inter-connections to minimize overall worst case delay.

The Feedforward Update (FFUPDATE) unit 38 adjusts the feedforward filter coefficients to minimize the equalizer error signal when reading from a digital storage channel with variable and changing parameters. The unit implements the Signed-LMS algorithm to adapt the FF unit coefficients using the equation:

$$w_{k+1} = \beta_f w_k + \mu_f e_k \text{sgn}(x_k). \quad (2)$$

The tap leakage factor $\beta_f$ (See reference 31 in Exhibit A.) can be either $1-2^{-8}$ or 1, and the adaptive step-size $\mu_f$ is $\mu_{f1}=2^{-n1}$ during training and $\mu_{fs}=2^{-n2}$ in steady-state operation, and $e_k$ is the equalizer error signal computed in the decision feedback loop. Using its MODE control output, the CONTROL unit 46 enables FFUPDATE to begin at the start of training. During training, the FFUPDATE unit 38 optimizes the FF coefficients from arbitrary initial conditions without any prior knowledge of the channel characteristics. After training is complete, CONTROL signals FFUPDATE to change the step-size to the steady-state value. During steady-state operation, FFUPDATE adjusts the FF coefficients to compensate for the relatively small channel variations that can occur after training.

Decision Feedback Loop (FEEDBACK) logic 48 subtracts trailing nonlinear intersymbol interference using an adjustable look-up table (dual ported RAM 50) and computes the equalizer error signal $e_k$ and decision output $\hat{a}_k$. The intermediate equalizer output $y_k$ is computed as $$y_k = f_k + r(\hat{a}_{k-1}), \quad (3)$$

where $\hat{a}_{k-1}$ is the collection of past equalizer decision outputs and $r()$ is the look-up table output. By passing the intermediate equalizer output through a $+1$, $-1$ limiting device, the current decision, $\hat{a}_k$, is formed. The equalizer error signal $e_k$ is computed as $$e_k = a_k - y_k. \quad (4)$$

The equalizer error signal $e_k$ is used by the FFUPDATE, FBUPDATE, and Steady State Timing Recovery units to adjust the equalizer parameters. During training, the correct current decision values, $\hat{a}_k$, are provided by the CONTROL unit 46 for use in $\hat{a}_{k-1}$ in order to eliminate the propagation of errors in the feedback loop. After training, the CONTROL unit signals FEEDBACK to start using the computed current decision as formed in equation 4.

The Feedback Update (FBUPDATE) unit 52 adjusts the FEEDBACK unit's look-up table (RAM 50) to minimize the equalizer error signal when reading a digital storage channel with variable and changing trailing intersymbol interference, and nonlinear distortion. During training and steady state operation, this unit adjusts the currently addressed look-up table (RAM) location using the LMS algorithm $$\tau_{k+1} = \beta_r \tau_k + \mu_r e_k. \quad (5)$$

The tap leakage factor $\beta_r$ can be either $1-2^{-8}$ or 1, and the adaptive step-size $\mu_r$ is $\mu_{rt}=2^{-n3}$ during training and $\mu_{rs}=2^{-n4}$ in steady-state operation. The CONTROL unit 46 triggers the FBUPDATE unit to begin training after the SYNC field has been detected, and then switches the FBUPDATE unit to steady-state operation after the completion of training. During training, the FBUPDATE unit optimizes the RAM contents from arbitrary initial conditions without any prior knowledge of the channel. During steady-state operation, FBUPDATE adjusts the RAM to compensate for relatively small channel variations that can occur after training.

The Timing Acquisition (ACQUIRE) unit 40 adaptively computes the timing error signal during the acquisition, which occurs just after the read head has arrived at a new data sector. The timing error signal is used to adjust the off-chip VCO 26, which determines a sampling phase for the read-signal A/D converter 22 and chip clock. At the beginning of the track, a rate 1/4T (T=bit-period) square wave is written. The initial timing acquisition algorithm drives the sampling points to the peaks and zero-crossings of the rate 1/4T signal. The phase acquisition gradient update equations are $$z_k = \begin{cases} \text{sgn}(x_{k-1})(x_k) & \text{for } k \text{ even} \\ 0 & \text{for } k \text{ odd} \end{cases} \quad (6)$$

$$\Delta_{k+1} = \Delta_k + \beta_i z_k \quad (7)$$

$$\tau_{k+1} = \tau_k + \alpha_i z_k + \Delta_{k+1}, \quad (8)$$

where $\alpha_i = 2^{-n5} + 2^{-n6}$ and $\beta_i = 2^{-n7} + 2^{-n8}$ are the loop filter gain parameters, $z_k$ is the timing error signal, and $\tau_k$ is the timing phase. The error signal output from the chip on line 31 is $\alpha_i z_k + \Delta_{k+1}$, with the loop in equation (8) being implemented in the off-chip VCO 26. The CONTROL unit 46 triggers the ACQUIRE unit 40 to begin operation after arrival at a new track, and disables the ACQUIRE unit 40 after acquisition is complete.

During acquisition, the Variable Gain Amplifier Update unit 42 (referred to as the VGA_CTL unit 42) sets the approximately correct gain level at the input to the read-signal D/A Converter 16 during the 1/4T acquisition signal. This gain level is held during steady state operation. Using a gradient update, the VGA control signal is generated as $$\gamma_{k+1} = \gamma_k + \mu_g g_k \quad (9)$$

$$g_k = \begin{cases} (VGA \text{ constant}) - |x_{k-1}| & \text{for } k \text{ even} \\ 0 & \text{for } k \text{ odd}, \end{cases} \quad (10)$$

where $\mu_g = 2^{-n10}$, VGA constant = 10-bit programmable positive value, and $g_k$ is the gain error value. The control signal $\gamma_k$ is output from the chip as a 4-bit value. The CONTROL unit 46 triggers the VGA_CTL unit 42 to begin operation after arrival at a new track, and disables the VGA_CTL unit at the end of acquisition.

The Synchronization Field Detection unit will be referred to as the SYNC unit 44. In the preferred embodiment, after gain and acquisition, a 35-bit synchronization field (SYNC field) is written to indicate to the equalizer when to start training. The SYNC unit identifies this special 35-bit pattern regardless of polarity with an extremely small miss and false detection rate (typically less than $10^{-9}$ for channel SNR's of only 13 dB). Upon recognizing this pattern, the SYNC unit 44 asserts the SYNC_DETECT signal on line 45 and determines the polarity of the read signal. This polarity information is then supplied to the CONTROL unit 46 via lines 47 so that it can provide a preprogrammed training sequence of the correct polarity.

During steady state operation, the Steady State Timing Recovery unit (STEADY) 54 adjusts the timing phase using a stochastic gradient algorithm and second-order phase-locked loop (PLL). The update equations are $$z_k = i_{k-1}\text{sgn}(f_k) - e_k\text{sgn}(f_{k-1}) \quad (11)$$

$$\Delta_{k+1} = \Delta_k + \beta_s z_k, \quad (12)$$

$$\tau_{k+1} = \tau_k + \alpha_s z_k + \Delta_{k+1}, \quad (13)$$

where $\alpha_s = 2^{-n10} 2^{-n11}$ and $\beta_s = 2^{-n12} + 2^{-n13}$, $f_k$ is the FF section output, and $z_k$ is the timing error signal. As with timing acquisition, the timing error signal $\alpha_s z_k + \Delta_{k+1}$ is output from the chip 10 to drive the VCO 26 that generates the A/D sampling clock. In this implementation, the ACQUIRE unit 40 and STEADY unit 54 share the same hardware block, which is configured by CONTROL unit 46 to run in either acquisition or steady-state operation.

The Control unit (CONTROL) 46 governs the modes of operation for the RAM-DFE chip 10, based on user programmed values and the SYNC-DETECT signal from the SYNC unit 44. During the SETUP/TEST mode, a user can initialize, set and read the RAM-DFE chip internal state, including the step sizes, equalizer coefficients, and counters that govern the duration of acquisition and training. When a track-read begins, the equalizer will normally be in RUN mode. RUN mode will start with acquisition of timing and gain (ACQUIRE submode), followed by recognition of the 35-bit SYNC field (Look for SYNC submode). After reception of the SYNC field, the SYNC unit 44 asserts SYNC-DETECT, which is used by the CONTROL unit 46 to end acquisition. Training of the equalizer (TRAIN submode) on known data (programmable) then begins after a programmable delay. After training has completed, the CONTROL unit 46 triggers the equalizer to start steady state operation (STEADY STATE submode). Steady-state operation then continues until the STOP signal is received. After receiving STOP, the CONTROL unit stops all adaptation. All equalizer parameters will be held until either the START or SETUP/TEST signals are received. If START is received, the equalizer will immediately enter the RUN mode, allowing the read-head to move between date sectors and retain the current equalizer parameters. If SETUP/TEST is received, a chip user will be able to initialize, set and read the RAM-DFE chip internal state.

Figure 3B:
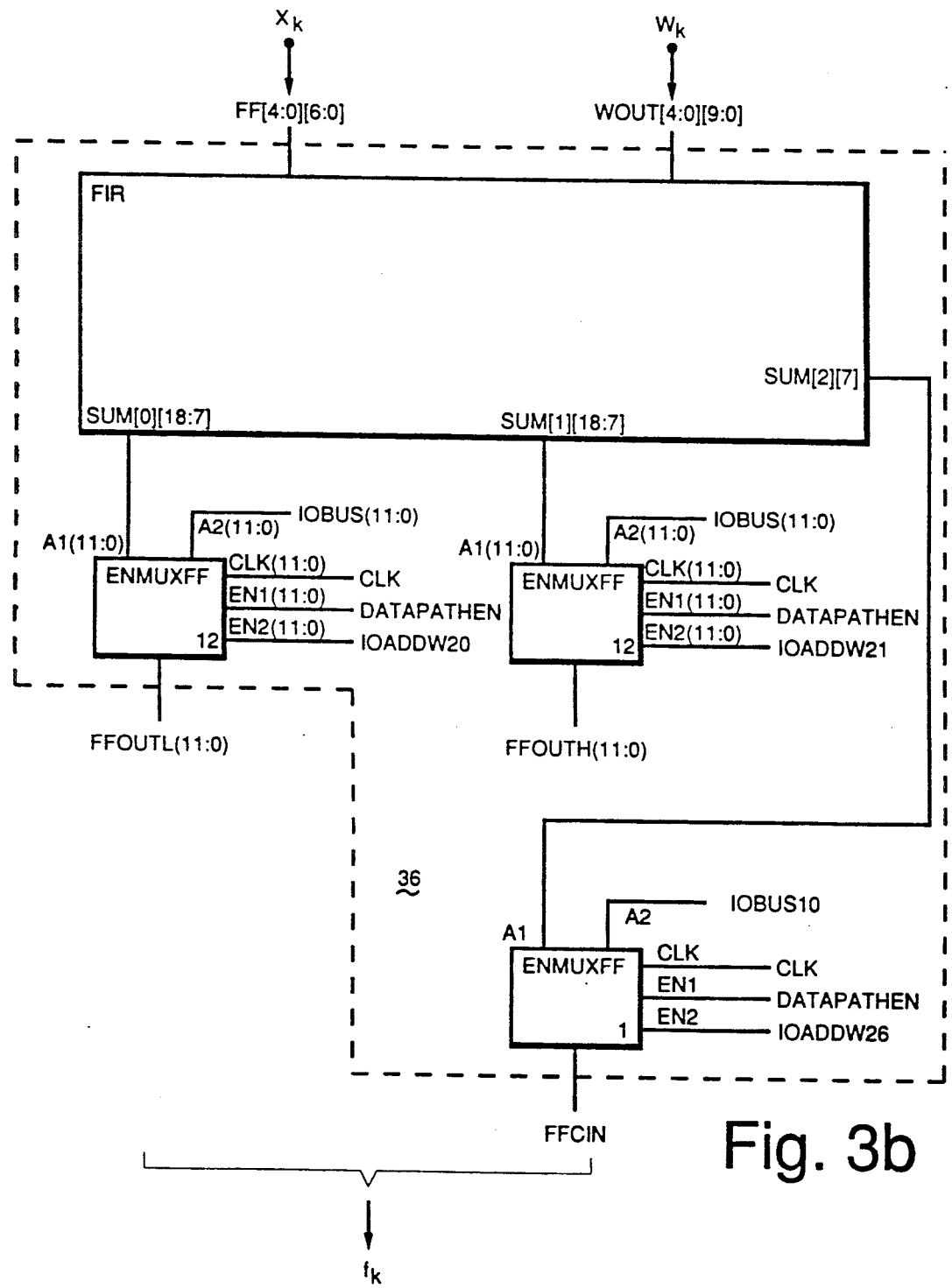
FIG. 3B is a schematic diagram illustrating an implementation of the feedforward filter FF illustrated in FIG. 2 of the drawing.
Figure 4:
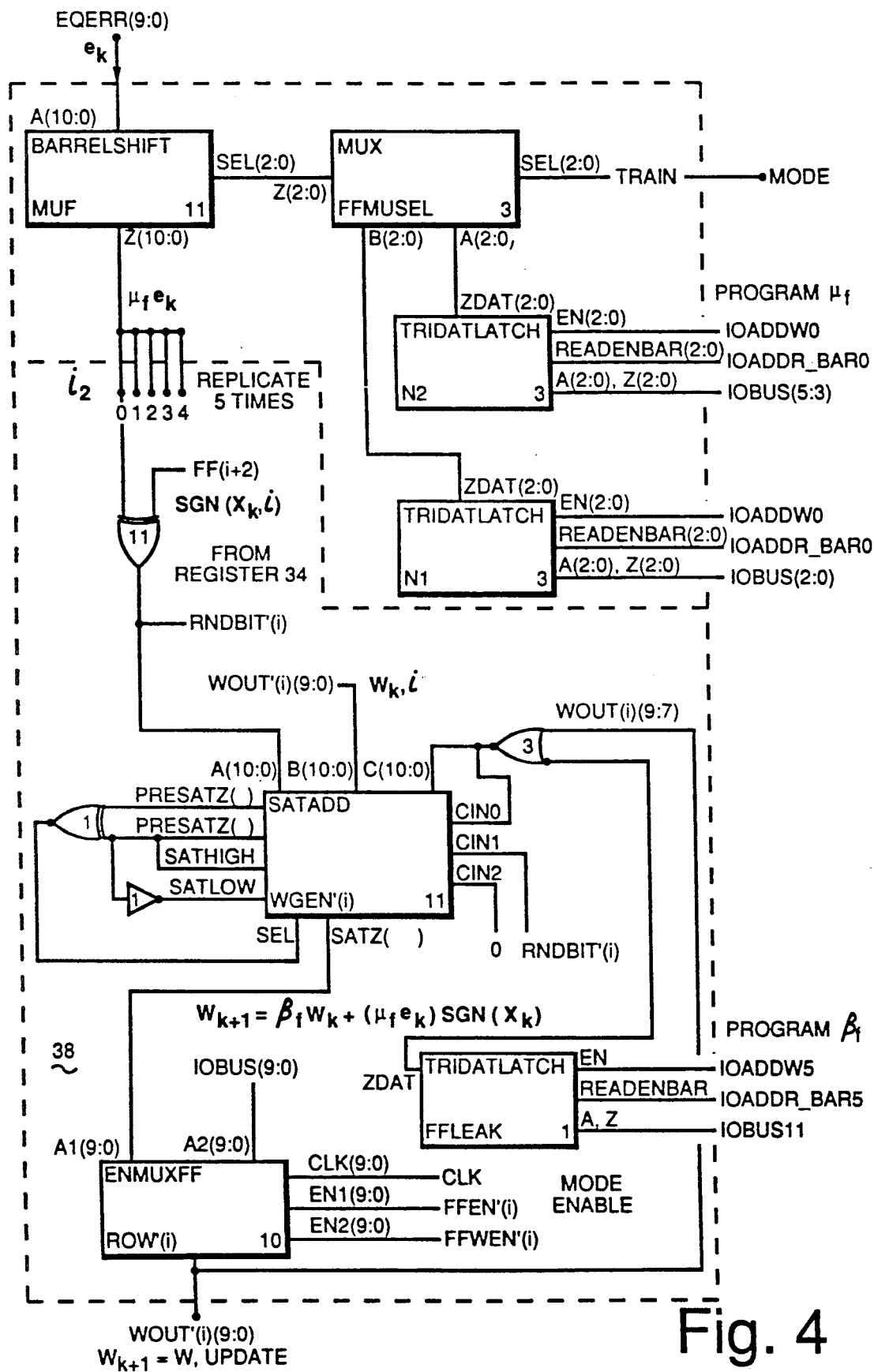
FIG. 4 is a schematic illustration of an implementation of the feedforward update unit FFUPDATE illustrated in FIG. 2 of the drawing.
Figure 6:
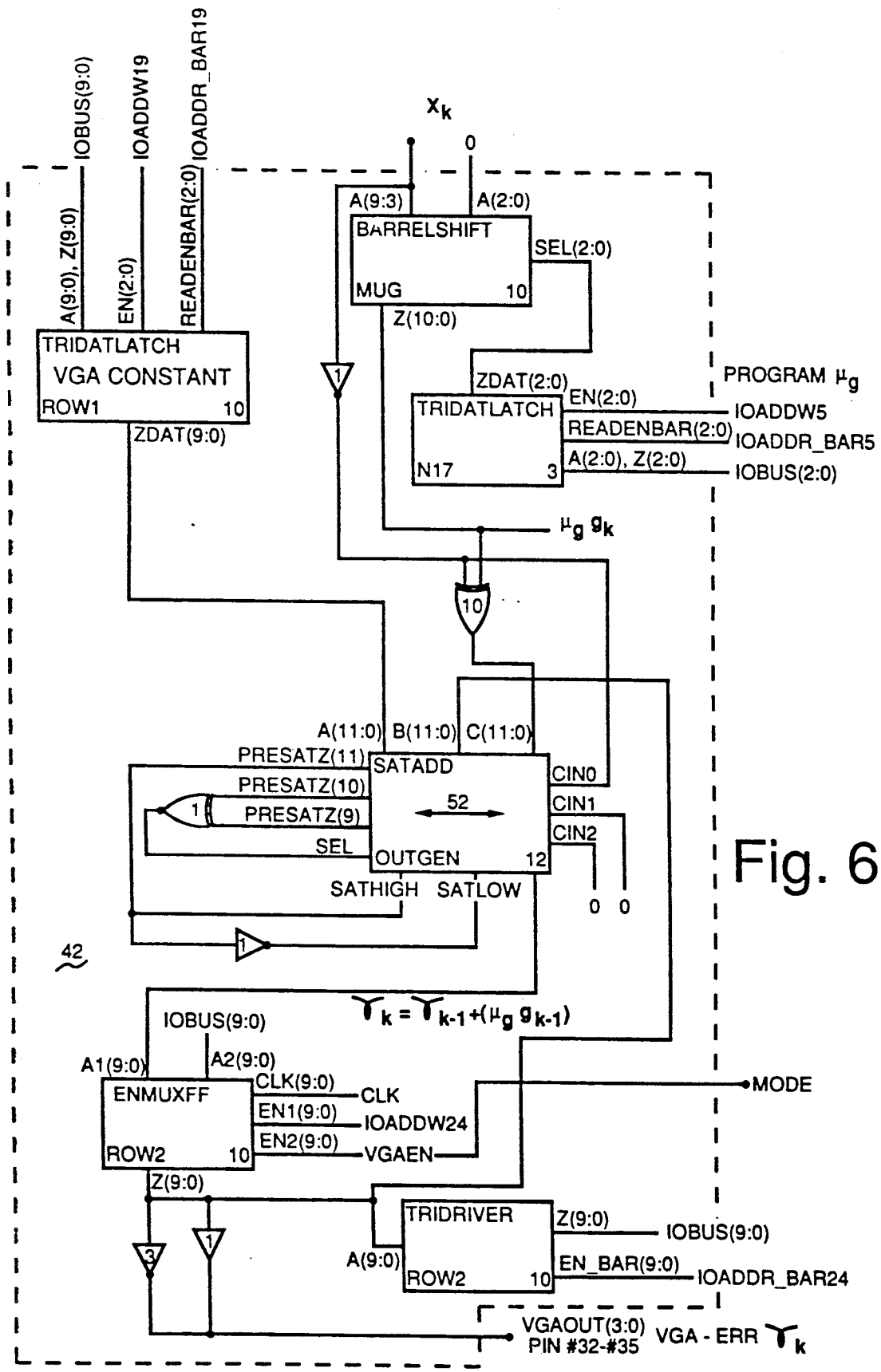
FIG. 6 is a schematic illustration showing an implementation of the variable gain amplifier update unit VGA-CTL shown in FIG. 2 of the drawing.
Figure 7:
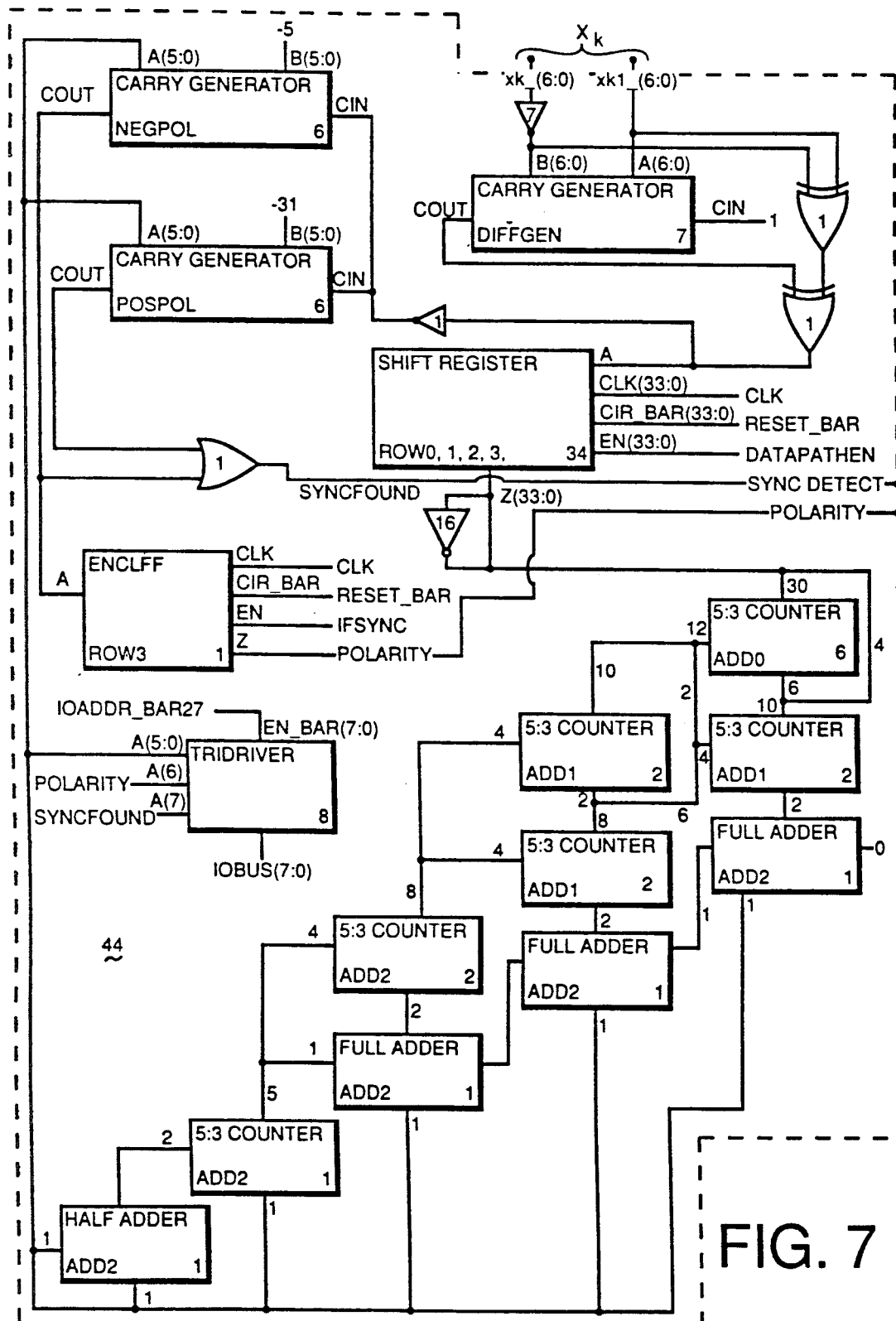
FIG. 7 is a schematic illustration showing an implementation of the synchronization field detection unit SYNC depicted in FIG. 2 of the drawing.
Figure 8A:
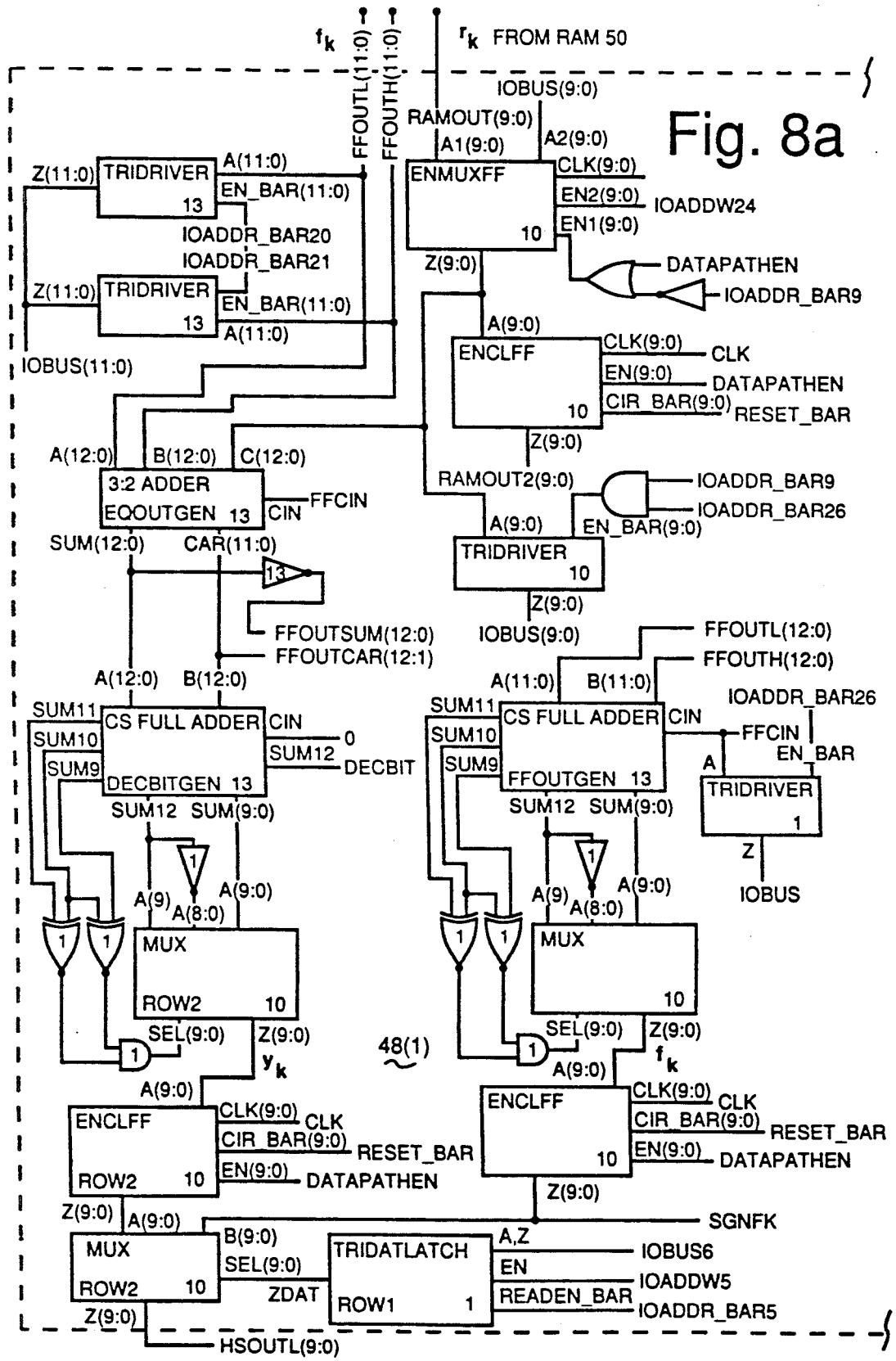
FIGS. 8a, 8b and 8c are collectively a schematic illustration of the decision feedback loop FEEDBACK LOGIC depicted in FIG. 2 of the drawing.
Figure 8B:
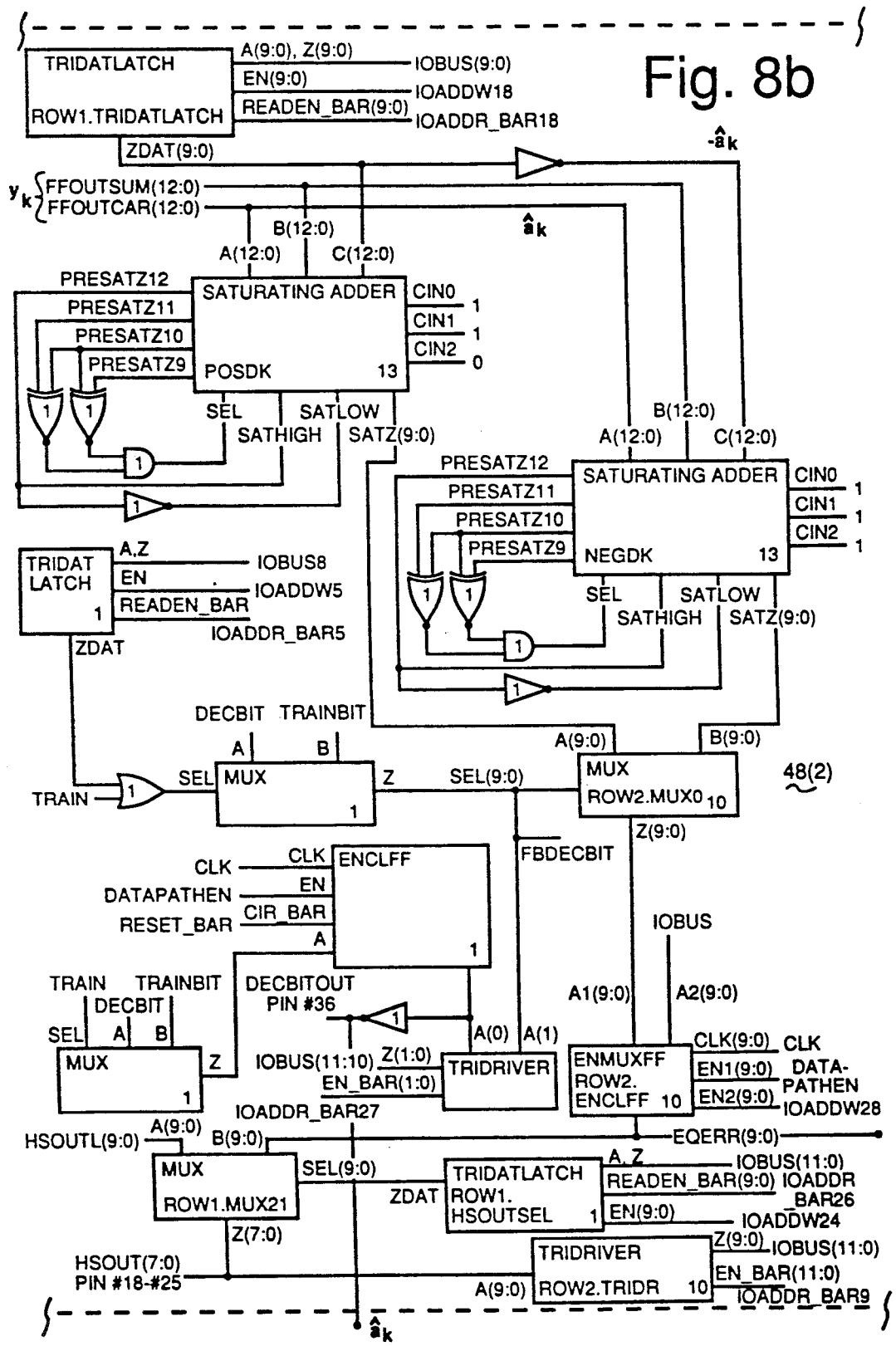
Figure 8C:
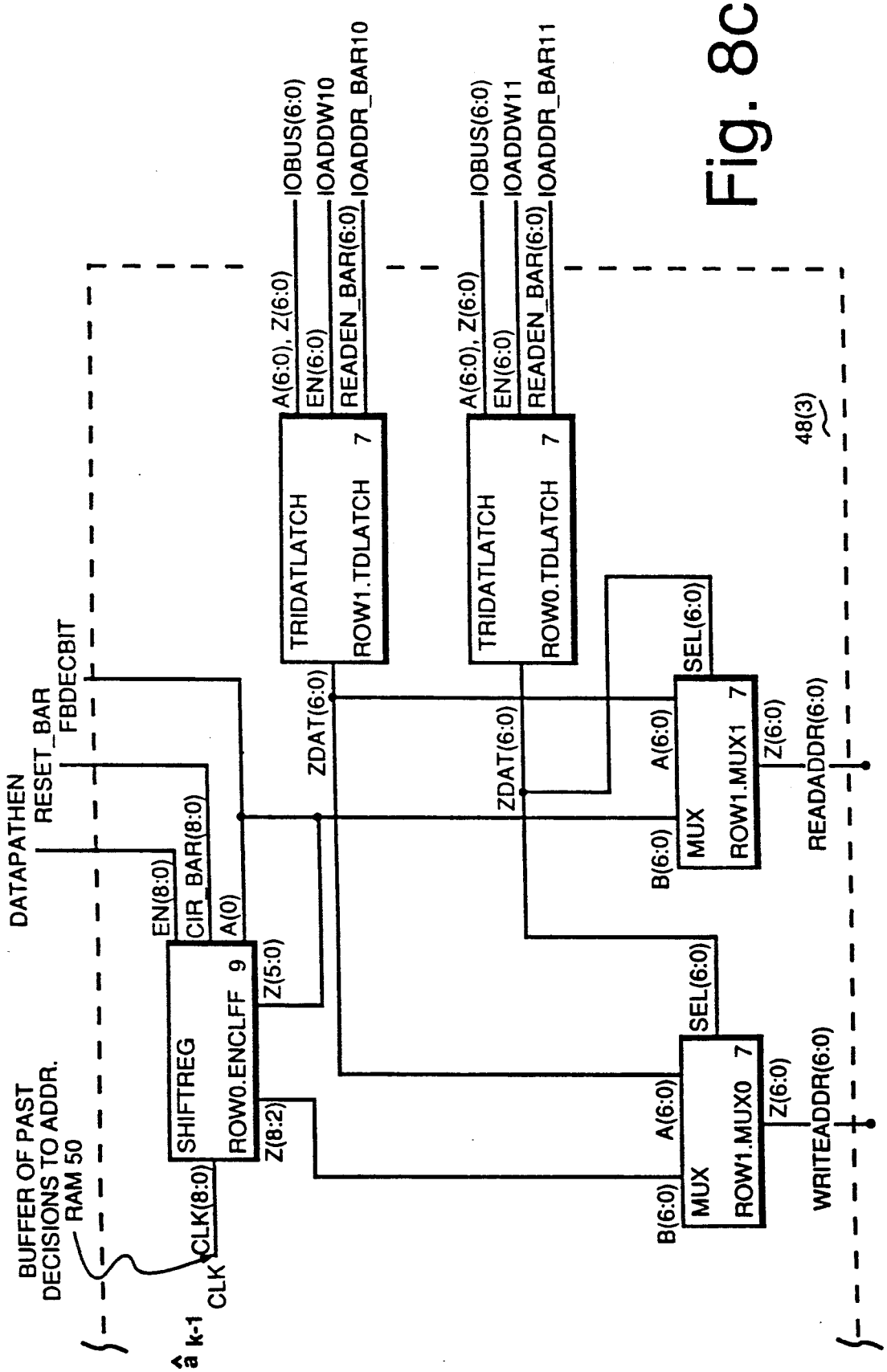
Figure 9:
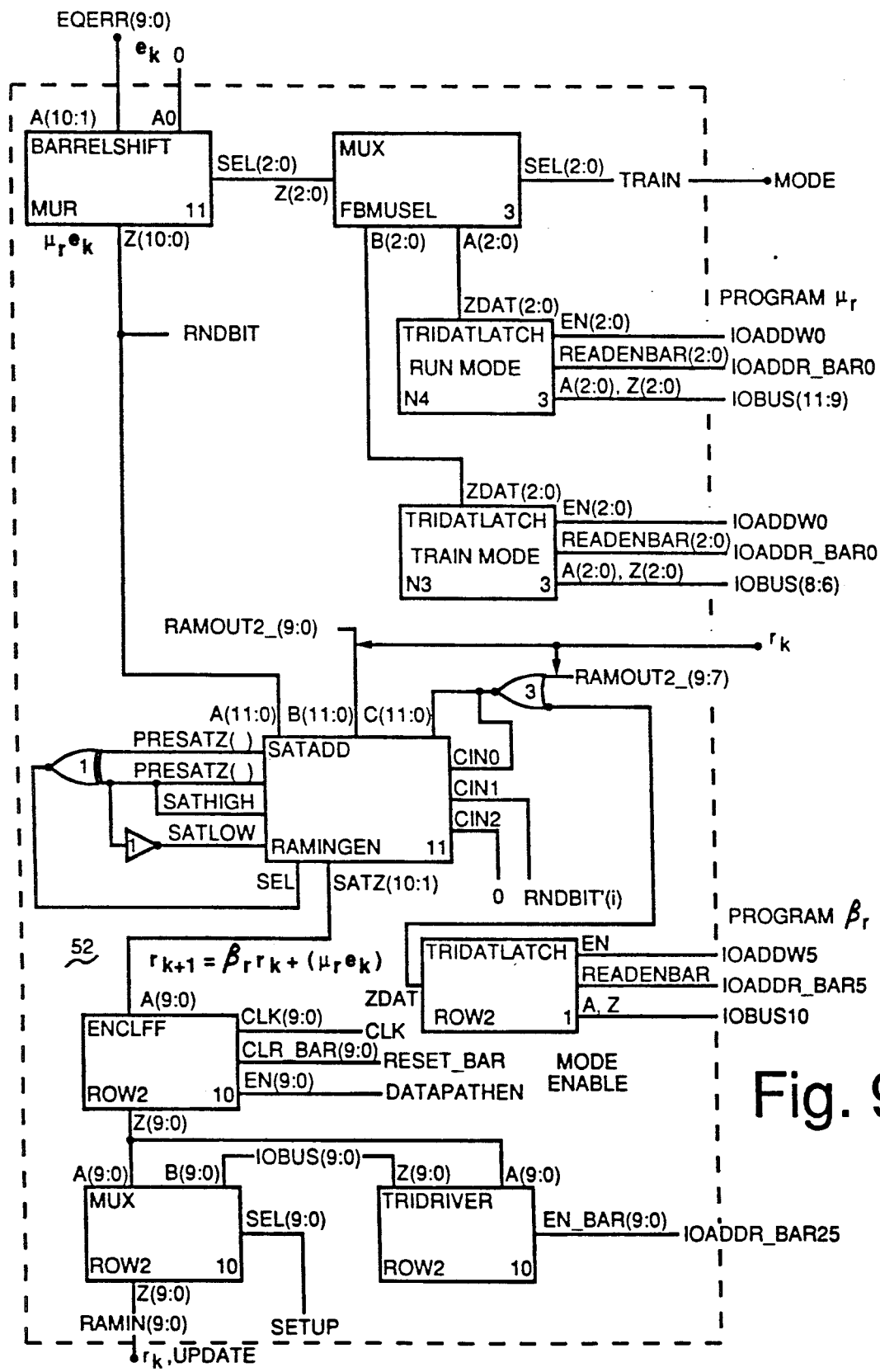
FIG. 9 is a schematic illustration showing an implementation of the feedback update unit FBUPDATE depicted in FIG. 2 of the drawing.

Turning now to FIG. 3B of the drawing, a logic block diagram is depicted showing an implementation of the FIR filter 36. The box labeled FIR represents a logic circuit designed by a computer software program which seeks to minimize critical path delay at the output of the filter by using adder propagation delays to determine the net list. The program net allocation algorithm using C pseudo-code may be described as follows:

```
For each column in the FIR, while nets remain in netlist N {
    /* evenly distribute the chosen instances in the column. */
    Get the next instance, I.
    Let min_delay = MAX_INT. /* Initialize minimum output delay value. */
    For each output port, o_j, in instance I {
        /* optimize choice of nets to minimize delay at output o_j */
        Order the input ports of I from largest to shortest propagation delay to oj
        /* process the longest delay path first. */
        Select the fastest net from N, for input i_o.
        Let current_delay = delay of net + propagation delay from i_o from o_j.
        For the remaining input ports, i_k, in the ordered list {
            Select a net from N for i_k which minimizes the slack at o_j.
            If no nets arrive early enough, select the fastest net.
            current_delay + max[current_delay, delay of net + propagation delay from i_k to o_j].
        }
        max_delay = max_o[output delay], for the current net-to-port map.
        If max_delay < min_delay {
            best_mapping = j.
            min_delay = max_delay.
        }
    }
    Connect the nets to the ports according to best_mapping.
    Place the sum and carry output nets on N.
}
```

This software is intended for use with BiCMOS Sea-of-Gates architecture, although it is applicable to any gate-array or standard-cell architecture that uses variable sized routing channels between columns (or rows) of adder components.

The user provides 6 numerical parameters to the software in order to specify his design. The software generates a netlist connection of basic macros (e.g., full adders) and a placement of the macros according to the Sea-of-Gates architecture. The outputs are generated in either the usual single bit form, or in carry-save (dual-bit) form with a rounding option.

The software accepts 6 input parameters $N_1$ through $N_6$ from the user. These parameters are as follows:
1) $N_1$: number of taps in the FIR filter,
2) $N_2$: numerical precision of horizontal inputs,
3) $N_3$: numerical precision of vertical inputs,
4) $N_4$: number of constant inputs,
5) $N_5$: numerical precision of constant inputs, and
6) round below bit $N_6$.

In the FIR filter, external input locations are predetermined as a way of partially constraining the final layout for purposes of I/O regularity. However, the netlist and adder placement are optimized to minimize the FIR filter's critical path delay by using adder propagation delays, wiring delays, and total wirelength to determine actual net connections and component placement. Automated usage of adder delays in constructing the filter is important because delay paths through adder components may not be easily controlled.

Along with a netlist, the software provides the propagation delays to each output of the FIR block (based on user supplied delay characteristics of the adder components). The circuit netlist is stored in an internal database that the software can scan to generate output in any desired format. Currently, the software provides hardware language output suitable for simulation and layout.

In the FIR filter, we perform (in parallel) $N_1$ multiply operations of pairs of 2's complement inputs with an accumulation of all products. For efficiency, we interleaved the $N_1$ multiplies so that each input corresponds to $N_1$ inputs in the FIR case.

Also, we include the capability of pipelining the FIR filter. For this to be possible, the FIR filter must accept constant inputs from a previous stage. The number of constant inputs from previous stages (possibly a tree of stages) is $N_4$ generation stage. The constant type inputs may have a different numerical precision which is defined by $N_5$. In this way, the outputs of previous FIR stages may be accepted as input, making pipelining possible. To facilitate further FIR stages, the output of each stage is internally latched in flip-flops that are placed inside the adder array.

This software provides a general method for optimizing critical path delays in FIR filters. In our technique, the wiring channels become larger and more irregular and some nets become longer, but the resulting FIR filter will be faster than in regular arrays.

The software uses a net allocation scheme that heuristically attempts to minimize the critical path delay of the entire block when consuming partial product input nets and the sum output nets which are derived from earlier addition operations. We process nets according to a producer-consumer relationship on a column by column basis. For each column, we maintain a list of nets to be consumed. Each adder (counter) consumes N nets (three for full adders) from the "consume" list for the current column and produces M nets (two for the full adder) that are placed in their appropriate consume lists for later consumption. This process continues until only 1 or 2 nets per column remain (single or dual-bit form).

First, we use the fastest net. After that, we operate on a "just in time" principle that minimizes the slack between inputs.

FIGS. 4-9 illustrate respectively in block diagram form implementations of the FFUPDATE unit 38, the ACQUIRE unit 40/STEADY unit 54, the VGA-CTL unit 42, the SYNC unit 44, the FEEDBACK LOGIC unit 48, and the FBUPDATE unit 52. In these Figures the values calculated in accordance with the equations previously stated are indicated at appropriate points in the diagrams.

Although the present invention has been described above in terms of a preferred embodiment depicted in schematic form and in detail sufficient to enable one skilled in the art to practice the invention, Applicants attach hereto as Exhibits C and D the following documents entitled "A High-Speed Adaptive Equalizer for Magnetic Disk Drives" by W. L. Abbott, P. S. Bednarz, K. D. Fisher, and J. M. Cioffi, presented in Albuquerque, New Mexico at the Internaltional Conference on Acoustics, Speech, and Signal Processing in April, 1990, and "Timing Recovery for Adaptive Decision Feedback Equalization of the Magnetic Storage Channel" by William L. Abbott and John M. Cioffi, presented in San Diego, California at Globecom '90 in December, 1990, both of which are hereby incorporated by reference.

What is claimed is:

1. Decision feedback equalizer apparatus for processing data stored in a data storage unit, comprising:

data input buffer means (34) for temporarily storing sampled read signals obtained from the data storage unit and for outputting signals corresponding to data input vectors $x_k$;

gain acquisition means (42) responsive to said vector $x_k$ signals and operative to generate gain error $\gamma_k$ signals for controlling the gain of the read signals input to said input buffer means;

timing acquisition means (40) responsive to said vector $x_k$ signals and operative to generate a timing error signal for controlling the sampling phase of the read signals input to said input buffer means;

synchronizing means (44) responsive to said vector $x_k$ signals and operative to detect a predetermined string of bit values corresponding to information contained therein and to generate sync detect signals and polarity signals;

FIR filter means (36) responsive to equalizer coefficient w signals and said vector $x_k$ signals and operative to generate linear filter output $f_k$ signals;

register means (39) initially programmed to contain equalizer coefficient w signals and reprogrammable to store updated coefficient w,update signals;

feedforward update logic means (38) responsive to said vector $x_k$ signals and feedback error $e_k$ signals, and operative to adjust said equalizer coefficient w signals to develop said w,update signals;

dual ported random access memory means (50) for storing a plurality of equalizer coefficient $r_k$ signals;

feedback logic means (48) responsive to said linear filter output $f_k$ signals, equalizer coefficient $r_k$ signals obtained from said random access memory means, and train data signals, and operative to compute said feedback error $e_k$ signals and equalizer output $a_k$ signals;

feedback update logic means (52) responsive to said equalizer coefficient $r_k$ signals and said feedback error $e_k$ signals, and operative to adjust the value of said $r_k$ signals for input back to said random access memory means as $r_k$,update signals;

steady-state timing logic means (54) responsive to said linear filter output $f_k$ signals and said feedback error $e_k$ signals and operative to generate timing error signals for adjusting the phase of said input read signals during a steady-state mode period; and control means (46) responsive to said polarity signals and said sync detect signals and operative to generate said train data signals and mode control signals for causing said equalizer apparatus to operate in either a set-up/test mode or a run mode, whereby read signals input from a data storage unit are sampled, amplified and digitally processed to decode data stored information bits with the result that data storage density may be increased and error rate decreased.

2. Decision feedback equalizer apparatus for processing data stored in a data storage unit as recited in claim 1 wherein said control means is configured such that said run mode includes an acquire submode, a look-for-sync submode, a train submode, and a steady-state submode.

3. Apparatus for processing data stored on storage media comprising:

voltage gain amplifier means responsive to gain error signals and operative to correspondingly amplify a read signal input thereto from the storage media;

low pass filter means for filtering the amplified read signal;

voltage controlled oscillator means responsive to timing error signals and operative to adjust the phase of the filtered read signal; and adaptive decision feedback equalizer means for receiving the filtered read signal and for generating said gain error signals and said timing error signals, and operative to produce equalizer output signals in which nonlinearities caused by radial channel variation and intersymbol interference have been substantially reduced, said equalizer apparatus including an error corrected feedforward filter means for developing linear filter output signals, and feedback means for receiving said linear filter output signals and including feedback logic and random access memory (RAM) means in the feedback path of said feedback logic, and from which previously stored information can be obtained to compensate for trailing nonlinear distortion in the processed read signal.

4. Apparatus for processing data stored on storage media as recited in claim 3 wherein said equalizer means further includes:

data input buffer means for receiving said filtered read signals and for outputting data input vector signals;

gain acquisition means responsive to said vector signals and operative to generate said gain error signals;

timing means responsive to said vector signals and operative to generate said timing error signals; and synchronizing means responsive to said vector signals and operative to detect a predetermined string of bit values contained therein and to generate sync detect signals and polarity signals.

5. Apparatus for processing data stored on storage media as recited in claim 4 wherein said equalizer means further includes:

register means initially programmed to contain equalizer coefficient (w) signals and reprogrammable to store updated coefficient (w,update) signals; and feedforward update logic means responsive to said vector signals and feedback error signals and operative to adjust said equalizer coefficient (w) signals to develop said updated coefficient (w,update) signals for input to said register means.

6. Apparatus for processing data stored on storage media as recited in claim 5 wherein said equalizer means further includes feedback update logic means responsive to equalizer coefficient ($r_k$) signals stored in said RAM means and said feedback error signals, and operative to adjust the values of said coefficient ($r_k$) signals for input back into said RAM means as coefficient update ($r_k$,update) signals.

7. Apparatus for processing data stored on storage media as recited in claim 6 wherein said timing means further includes steady-state timing logic means responsive to said linear filter output signals and said feedback error signals and operative to generate timing error signals during a steady-state mode period.

8. Apparatus for processing data stored on disk media as recited in claim 7 wherein said equalizer means further includes control means responsive to said polarity signals and said sync detect signals and operative to generate said train data signals and mode control signals for causing said equalizer apparatus to operate in either a set-up/test mode or a run mode, whereby read signals input to said apparatus are sampled, amplified and digitally processed to decode the information bits contained therein with the result that media storage density may be increased and error rate decreased.

9. Apparatus for processing data stored on storage media as recited in claim 3 wherein said equalizer means further includes:

register means initially programmed to contain equalizer coefficient (w) signals and reprogrammable to store updated coefficient (w,update) signals; and feedforward update logic means responsive to said vector signals and feedback error signals and operative to adjust said equalizer coefficient (w) signals to develop said updated coefficient (w,update) signals for input to said register means.

10. Apparatus for processing data stored on storage media as recited in claim 9 wherein said equalizer means further includes feedback update logic means responsive to equalizer coefficient ($r_k$) signals stored in said RAM means and said feedback error signals, and operative to adjust the values of said coefficient ($r_k$) signals for input back into said RAM means as coefficient update ($r_k$,update) signals.

11. Apparatus for processing data stored on storage media as recited in claim 3 wherein said equalizer means further includes feedback update logic means responsive to equalizer coefficient ($r_k$) signals stored in said RAM means and said feedback error signals, and operative to adjust the values of said coefficient ($r_k$) signals for input back into said RAM means as coefficient update ($r_k$,update) signals.

12. Apparatus for processing data stored on storage media as recited in claim 3 wherein said timing means further includes steady-state timing logic means responsive to said linear filter output signals and said feedback error signals and operative to generate timing error signals during a steady-state mode period.

13. Apparatus for processing data stored on storage media as recited in claim 4 wherein said equalizer means further includes control means responsive to said polarity signals and said sync detect signals and operative to generate said train data signals and mode control signals for causing said equalizer apparatus to operate in either a set-up/test mode or a run mode, whereby read signals input to said apparatus are sampled, amplified and digitally processed to decode the information bits contained therein with the result that disk storage density may be increased and error rate decreased.

14. Apparatus for processing data stored on storage media as recited in claim 13 wherein said equalizer means further includes:

register means initially programmed to contain equalizer coefficient (w) signals and reprogrammable to store updated coefficient (w,update) signals; and feedforward update logic means responsive to said vector signals and feedback error signals and operative to adjust said equalizer coefficient (2) signals to develop said updated coefficient (w,update) signals for input to said register means.

15. Apparatus for processing data stored on storage media as recited in claim 14 wherein said equalizer means further includes feedback update logic means responsive to equalizer coefficient ($r_k$) signals stored in said RAM means and said feedback error signals, and operative to adjust the values of said coefficient ($r_k$) signals for input back into said RAM means as coefficient update ($r_k$,update) signals.

16. Apparatus for processing data stored on storage media as recited in claim 15 wherein said timing means further includes steady-state timing logic means responsive to said linear filter output signals and said feedback error signals and operative to generate timing error signals during a steady-state mode period.

17. Apparatus for processing data stored on storage media as recited in claim 5 wherein said equalizer means further includes control means responsive to said polarity signals and said sync detect signals and operative to generate said train data signals and mode control signals for causing said equalizer apparatus to operate in either a set-up/test mode or a run mode, whereby read signals input to said apparatus are sampled, amplified and digitally processed to decode the information bits contained therein with the result that media storage density may be increased and error rate decreased.

18. Apparatus for processing data stored on storage media as recited in claim 11 wherein said equalizer means further includes:

register means initially programmed to contain equalizer coefficient (w) signals and reprogrammable to store updated coefficient (w,update) signals; and feedforward update logic means responsive to said vector signals and feedback error signals and operative to adjust said equalizer coefficient (w) signals to develop said updated coefficient (w,update) signals for input to said register means.

19. Apparatus for processing data stored on storage media as recited in claim 18 wherein said equalizer means further includes:

data input buffer means for receiving said filtered read signals and for outputting data input vector signals;

gain acquisition means responsive to said vector signals and operative to generate said gain error signals;

timing means responsive to said vector signals and operative to generate said timing error signals; and synchronizing means responsive to said vector signals and operative to detect a predetermined string of bit values contained therein and to generate sync detect signals and polarity signals.

20. Apparatus for processing data stored on storage media as recited in claim 12 wherein said equalizer means further includes:

register means initially programmed to contain equalizer coefficient (w) signals and reprogrammable to store updated coefficient (w,update) signals; and feedforward update logic means responsive to said vector signals and feedback error signals and operative to adjust said equalizer coefficient (w) signals to develop said updated coefficient (w,update) signals for input to said register means.

21. Apparatus for processing data stored on storage media as recited in claim 20 wherein said equalizer means further includes:

data input buffer means for receiving said filtered read signals and for outputting data input vector signals;

gain acquisition means responsive to said vector signals and operative to generate said gain error signals;

timing means responsive to said vector signals and operative to generate said timing error signals; and synchronizing means responsive to said vector signals and operative to detect a predetermined string of bit values contained therein and to generate sync detect signals and polarity signals.

* * * * *